United States Patent
Fujino et al.

(10) Patent No.: US 12,030,174 B2
(45) Date of Patent: Jul. 9, 2024

(54) MACHINE CONTROL VIA WIRELESS COMMUNICATION

(71) Applicant: KABUSHIKI KAISHA YASKAWA DENKI, Kitakyushu (JP)

(72) Inventors: Kazuo Fujino, Fukuoka (JP); Tadasuke Yuba, Fukuoka (JP); Ryo Shimodome, Fukuoka (JP); Ryota Moriwaka, Fukuoka (JP); Kazutoshi Kobayashi, Fukuoka (JP)

(*) Notice: Subject to any disclaimer, the term of this patent is extended or adjusted under 35 U.S.C. 154(b) by 237 days.

(21) Appl. No.: 17/520,719

(22) Filed: Nov. 8, 2021

(65) Prior Publication Data
US 2022/0080601 A1   Mar. 17, 2022

Related U.S. Application Data

(63) Continuation of application No. PCT/JP2020/019141, filed on May 13, 2020.
(Continued)

(51) Int. Cl.
*B25J 13/00*  (2006.01)
*B25J 9/16*  (2006.01)
(Continued)

(52) U.S. Cl.
CPC .......... *B25J 13/006* (2013.01); *G05B 19/418* (2013.01); *G05B 2219/33097* (2013.01); *G05B 2219/33192* (2013.01)

(58) Field of Classification Search
CPC ..... B25J 13/006; B25J 9/1661; G05B 19/418; G05B 2219/33097; G05B 2219/33192; G08C 17/02; H04Q 9/04
See application file for complete search history.

(56) References Cited

U.S. PATENT DOCUMENTS

| | | | |
|---|---|---|---|
| 2006/0287769 A1* | 12/2006 | Yanagita | B25J 9/1682 700/245 |
| 2011/0306374 A1 | 12/2011 | Hirai | |

(Continued)

FOREIGN PATENT DOCUMENTS

| | | | |
|---|---|---|---|
| EP | 2381326 | 10/2011 | |
| EP | 2381326 A2 * | 10/2011 | ......... G05B 19/4185 |

(Continued)

OTHER PUBLICATIONS

International Search Report dated Jul. 21, 2020 for PCT/JP2020/019141.
(Continued)

*Primary Examiner* — Adam R Mott
*Assistant Examiner* — Heather J Keniry
(74) *Attorney, Agent, or Firm* — SOEI PATENT & LAW FIRM

(57) ABSTRACT

The machine control system includes: a machine configured to execute a motion according to a machine command; a controller server configured to control the machine; and a communication server. The controller server includes control circuitry configured to repeat operations according to a control cycle, the operations including: executing a motion program to generate the machine command for the machine; adding first cycle information designating a first use timing to the machine command; and transmitting the machine command including the first cycle information to the communication server. The machine includes a machine circuitry configured to repeat local operations for controlling the machine according to a local control cycle. The machine circuitry is further configured to: store the machine command received from the communication server; and call the stored machine command, based on the first cycle information added to the stored machine command, to use the (Continued)

machine command in the local control cycle corresponding to the first use timing.

21 Claims, 19 Drawing Sheets

Related U.S. Application Data

(60) Provisional application No. 62/879,528, filed on Jul. 28, 2019, provisional application No. 62/871,742, filed on Jul. 9, 2019, provisional application No. 62/866,622, filed on Jun. 26, 2019, provisional application No. 62/858,341, filed on Jun. 7, 2019, provisional application No. 62/846,759, filed on May 13, 2019.

(51) Int. Cl.
    *G05B 19/418* (2006.01)
    *G08C 17/02* (2006.01)
    *H04Q 9/04* (2006.01)

(56) References Cited

U.S. PATENT DOCUMENTS

| | | | |
|---|---|---|---|
| 2018/0264650 A1* | 9/2018 | Ojima | B25J 9/1669 |
| 2019/0101881 A1 | 4/2019 | Shimamura et al. | |

FOREIGN PATENT DOCUMENTS

| | | |
|---|---|---|
| EP | 3462257 | 4/2019 |
| EP | 3482886 | 5/2019 |
| JP | 2006-312237 | 11/2006 |
| JP | 2007-123952 | 5/2007 |
| JP | 2011-227902 | 11/2011 |
| JP | 2019-067045 | 4/2019 |
| JP | 2019-209454 | 12/2019 |
| WO | 2010095713 | 8/2010 |

OTHER PUBLICATIONS

International Search Report dated Jan. 19, 2021 for PCT/JP2020/042331.
Office Action issued in Japanese Patent Application No. JP2020-568483, dated Mar. 30, 2021 (with English partial translation).
International Preliminary Report on Patentability with Written Opinion dated Nov. 24, 2022 for PCT/JP2020/042331.
Extended Search Report in corresponding European Application No. 20804773.8, dated Apr. 20, 2023.
Office Action issued in Indian Patent Application No. 202117056144, dated Jun. 23, 2022.
International Preliminary Report on Patentability with Written Opinion dated Nov. 25, 2021 for PCT/JP2020/019141.
Soei Patent and Law Firm, Statement of Related Matters, dated Nov. 29, 2022.
Office Action issued in Chinese Patent Application No. 202080100688.4, dated Apr. 1, 2024 (with English partial translation).
Extended Search Report in corresponding European Application No. 20935131.1, dated Apr. 16, 2024.

* cited by examiner

MACHINE CONTROL VIA WIRELESS COMMUNICATION

CROSS-REFERENCE TO RELATED APPLICATIONS

This application is a continuation application of PCT Application No. PCT/JP2020/019141, which claims the benefit of priority from U.S. Provisional Patent Applications No. 62/846,759 filed on May 13, 2019, No. 62/858,341 filed on Jun. 7, 2019, No. 62/866,622 filed on Jun. 26, 2019, No. 62/871,742 filed on Jul. 9, 2019, No. 62/879,528 filed on Jul. 28, 2019, the entire contents of which are incorporated herein by reference.

BACKGROUND

Field

Japanese Unexamined Patent Application Publication No. 2019-209454 discloses a system including a robot, a processing apparatus, a robot controller for controlling the robot, a processing apparatus controller for controlling the processing apparatus, and a programmable logic controller for generating instructions for a robot controller and the processing apparatus controller.

SUMMARY

Disclosed herein is an example machine control system. The machine control system may include: a machine configured to execute a motion according to a machine command; a controller server configured to control the machine; and a communication server configured to communicate with the controller server via a wired communication network, and to communicate with the machine via a wireless communication network, wherein the controller server may include control circuitry configured to repeat operations according to a control cycle, the operations including: executing a motion program to generate the machine command for the machine; adding first cycle information designating a first use timing to the machine command; and transmitting the machine command including the first cycle information to the communication server, wherein the machine may include a machine circuitry configured to repeat local operations for controlling the machine according to a local control cycle, and wherein the machine circuitry is further configured to: store the machine command received from the communication server; and call the stored machine command, based on the first cycle information added to the stored machine command, to use the machine command in the local control cycle corresponding to the first use timing.

Additionally, an example machine is disclosed herein. The machine may include: a machine body configured to execute a motion; a terminal communication device configured to: communicate, via a wireless communication network, with a communication server configured to communicate with a control server via a wired communication network; and receive a machine command to which the control server has added cycle information designating a use timing via the communication server; and a machine control circuitry configured to repeat causing the machine body to execute the motion according to a local control cycle, wherein the machine control circuitry is further configured to: store the machine command received by the terminal communication device; and call the stored machine command, based on the cycle information added to the stored machine command, to cause the machine body to execute motion based on the called machine command in the local control cycle corresponding to the use timing.

Additionally, an example communication method is disclosed herein. The communication method may include: receiving, via a wired communication network, a machine command generated by a controller by repeatedly executing a motion program according to a control cycle; transmitting the machine command to a machine via a wireless communication network; receiving response information to which the machine has added cycle information designating a use timing via the wireless communication network; storing the received response information; and calling the stored response information, based on the cycle information added to the stored response information, to transmit the called response information to the controller server via the wired communication network, so that the motion program according to the called response information is executed in the control cycle corresponding to the use timing.

DETAILED DESCRIPTION

In the following description, with reference to the drawings, the same reference numbers are assigned to the same components or to similar components having the same function, and overlapping description is omitted.

Figure 1:
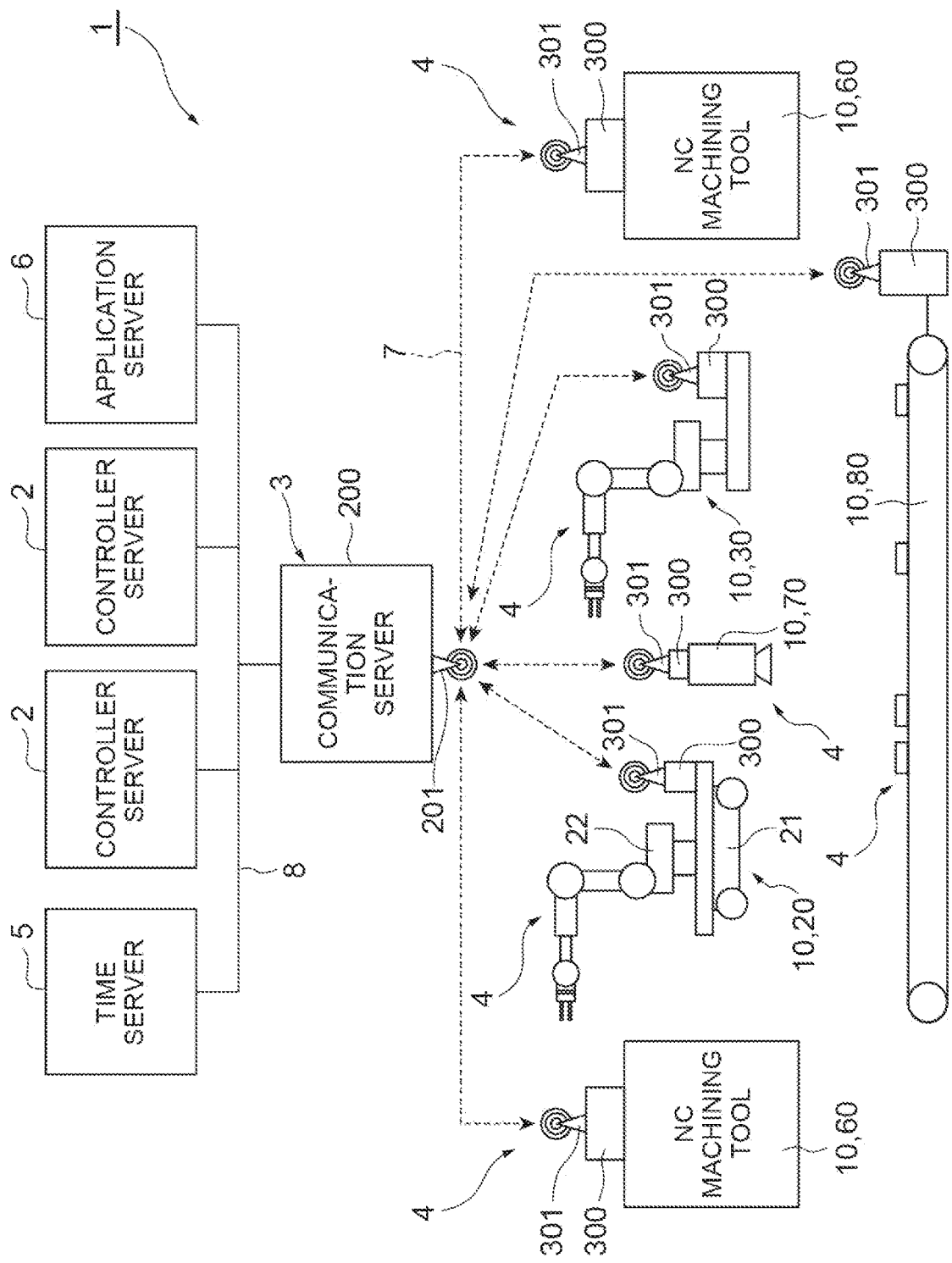
FIG. 1 is a schematic diagram illustrating a schematic configuration of a machine control system.

[machine control system] A machine control system 1 shown in FIG. 1 is a system for controlling a plurality of machines 4 based on calculation results transmitted from at least one controller server 2 via a wireless communication network. An example of the machine control system 1 is a production system that produces workpieces by collaborative motion of the plurality of machines 4. As shown in FIG. 1, the machine control system 1 includes at least one controller server 2, a communication server 3, and the plurality of machines 4.

Figure 3:
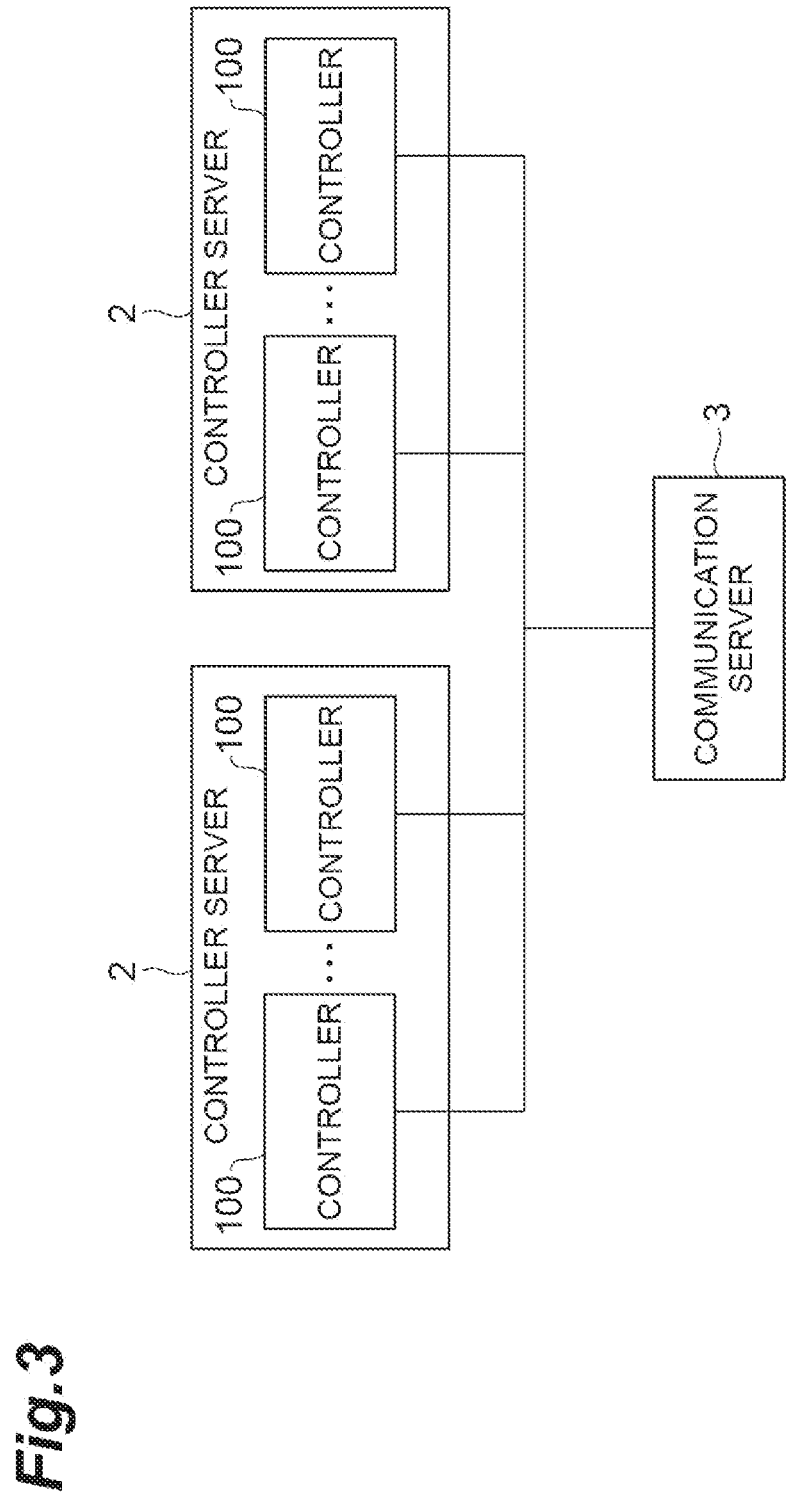
FIG. 3 is a block diagram illustrating a functional configuration of a controller server.

The controller server 2 is configured to execute a predetermined operation in a control cycle. The controller server 2 includes a plurality of controllers 100 (see FIG. 3). The plurality of controllers 100 are implemented on the virtual space in the controller server 2 and control the plurality of machines 4 respectively. One controller 100 corresponds to at least one machine 4. One controller 100 may correspond to two or more machines 4, and two or more controllers 100 may correspond to one machine 4. Implementing on a virtual space means that a function as the controller 100 is added to an arithmetic device such as the controller server 2 by software. The function as the controller 100 includes acquisition of information from the machine 4, generation of a machine command based on the acquired information, and output of the generated machine command to the machine 4. The plurality of controllers 100 may be distributed in two or more controller servers 2. In that case, the calculation load of one controller server 2 may be reduced.

The communication server 3 is configured to communicate with the controller server 2 via a wired communication network 8, to communicate with the plurality of machines 4 via a wireless communication network 7, and relays information between the controller server 2 and the plurality of machines 4. Examples of the wired communication network 8 include a local area network such as Ethernet (registered trademark). Examples of the wireless communication network 7 include a high-speed wireless communication network such as a fifth generation mobile communication system (5G). The communication server 3 may be provided at a location away from the controller server 2, may be provided at a location close to the controller server 2, or may be provided in a housing together with the controller server 2.

The communication server 3 includes a communication controller 200 and a wireless communication base station 201. The communication controller 200 is configured to communicate with the controller server 2 via the wired communication network 8, and to communicate with the plurality of machines 4 via the wireless communication base station 201. The wireless communication base station 201 is configured to communicate with wireless communication terminals 301 (described below) of the plurality of machines 4 via the wireless communication network 7.

The plurality of machines 4 are configured on the real space, and each of the plurality of machines 4 is configured to execute motion according to the operation result of the controller server 2. For example, the plurality of machines 4 execute motion according to the machine command. Executing motion means displacing at least one object in real space. The displacement includes movement and posture change. In addition, the displacement includes displacement in a space that is not visible from the outside, such as in a housing.

Each of the plurality of machines 4 has a machine body 10, a local controller 300, and a wireless communication terminal 301. The machine body 10 is configured to execute motion. The machine body 10 may be any device as long as the device is configured to execute motion based on the calculation result of the controller server 2. In FIG. 1, a mobile robot 20, a stationary robot 30, NC machining tool 60, an environmental sensor 70, and a conveyor 80 are shown as examples of the machine body 10. The mobile robot 20 is a robot capable of autonomous driving, and includes an unmanned transport vehicle 21 and a robot 22. The unmanned transport vehicle 21 performs autonomous driving according to a move command included in the machine command. Examples of the unmanned transport vehicle 21 include electric so-called automated guided vehicle (AGV). The robot 22 is configured to execute work on the workpiece according to a work command included in the machine command.

Figure 2:
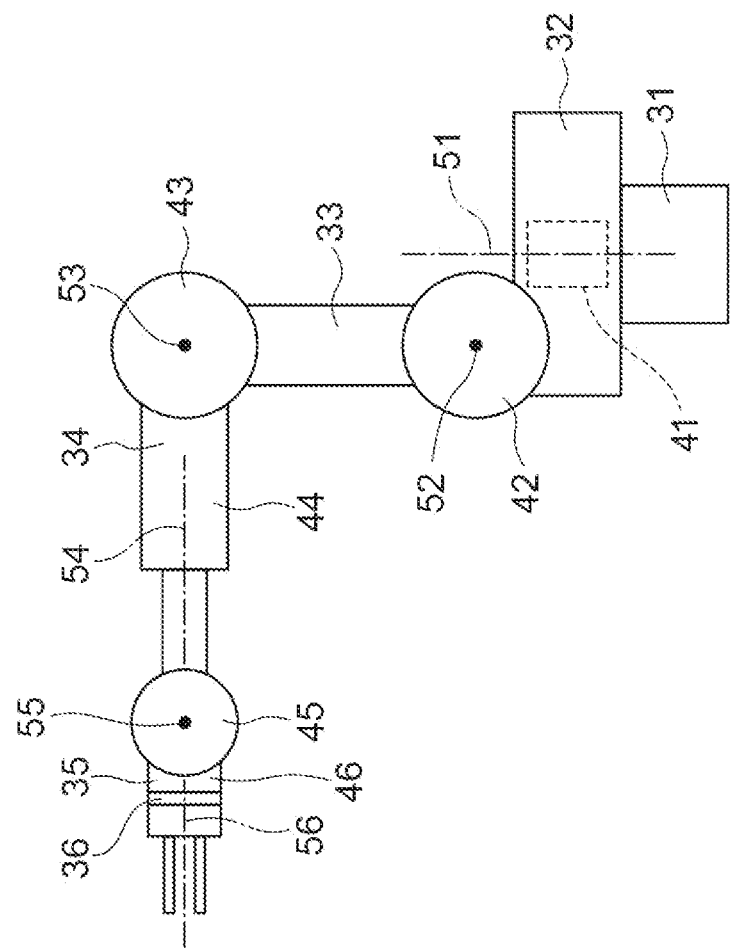
FIG. 2 is a schematic diagram illustrating a configuration of a robot.

For example, the robot 22 is a six axes articulated robot, and as shown in FIG. 2, includes a base 31, a turning portion 32, a first arm 33, a second arm 34, a third arm 35, a tip portion 36, and actuators 41, 42, 43, 44, 45, 46. The base 31 is fixed on the unmanned transport vehicle 21. The turning portion 32 is provided on the base 31 so as to rotate around a vertical axis 51. The first arm 33 is connected to the turning portion 32 to swing around an axis 52 that intersects (e.g., orthogonally intersects) the axis 51. The intersection also includes a case in skew relation such as a so-called three dimensional intersection. The second arm 34 is connected to the tip portion of the first arm 33 to swing around an axis 53 substantially parallel to the axis 52. The third arm 35 is connected to the tip portion of the second arm 34 so as to swing about an axis 54 along the second arm 34 and swing about an axis 55 that intersects (e.g., orthogonally intersects) the axis 54. The tip portion 36 is connected to the tip portion of the third arm 35 to pivot about an axis 56 that intersects (e.g., orthogonally intersects) the axis 55. In the tip portion 36, various tools such as a suction nozzle, a robot hand, and a processing tool are provided according to applications.

The actuators 41, 42, 43, 44, 45, 46 include, for example, an electric motor and a speed reducer, and drive the robot 22. For example, an actuator 41 is configured to swing the turning portion 32 around the axis 51, an actuator 42 is configured to swing the first arm 33 around the axis 52, an actuator 43 is configured to swing the second arm 34 around the axis 53, an actuator 44 is configure to swing the third arm 35 around the axis 54, an actuator 45 is configured to swing the third arm 35 around the axis 55, and an actuator 46 is configured to swing the tip portion 36 around the axis 56.

The configuration of the robot 22 can be changed. For example, the robot 22 may be a seven axes redundant robot obtained by further adding one axis joint to the six axes articulated robot, or may be a so-called scalar articulated robot. The robot 22 may be a so-called parallel link robot.

Returning to FIG. 1, the stationary robot 30 is placed on a floor surface of a work area or the like. Examples of the stationary robot 30 include a vertical articulated robot, a scalar articulated robot, and a parallel link robot, similarly to the robot 22. The NC machining tool 60 is configured to perform machining such as cutting on a workpiece in accordance with a machining command included in the machine command. The environmental sensor 70 is configured to acquire environment information of the system according to a sensing command included in the machine command. Examples of the environmental sensor 70 include a camera that acquires an environmental image of the system, and a temperature sensor configured to acquire an environmental temperature of the system. The conveyor 80 is configured to transport a workpiece according to a transport command included in the machine command. Examples of the conveyor 80 include a belt conveyor and a roller conveyor.

The local controller 300 is configured to communicate with the communication server 3 via the wireless communication terminal 301, and to cause the machine body 10 to execute motion according to the machine command acquired from the communication server 3 via the wireless communication terminal 301. The local controller 300 is configured to feed back a response information acquired from the machine body 10 to the communication server 3 via the wireless communication terminal 301. The wireless communication terminal 301 is configured to communicate with the wireless communication base station 201 via the wireless communication network 7 in accordance with instructions from the local controller 300.

With the practical use of the fifth generation mobile communication system (5G) and the like, high speed wireless communication has been available, and thus the feasibility of machine control via wireless communication has also increased. In machine control, generation of a machine command by execution of a motion program and control of the machine 4 according to the machine command may be repeated at a predetermined control cycle. When the machine command is transmitted and received via the wireless communication network 7 as described above, the fluctuation of the reception timing of the machine command on the machine 4 side increases due to wireless communication, and it may be difficult to receive the machine command in the control cycle on the machine 4 side. In addition, when the response information is transmitted and received via the wireless communication network 7, the fluctuation of the reception timing of the response information on the controller 100 side increases due to wireless communication, and it may be difficult to receive the response information in the control cycle on the controller 100 side.

On the other hand, the machine control system 1 may be configured to buffer the machine command transmitted from the controller side (the controller 100 side of the wireless communication network 7) via the wireless communication network 7 until a use timing at the machine side (the machine 4 side of the wireless communication network 7). In this case, the transmission of the machine command from the controller side may be advanced to provide a margin in the period from the reception timing of the machine command on the machine side to the use timing of the machine command. With this margin, the fluctuation of the reception timing expanded due to the wireless communication may be absorbed and the buffered machine command may be used at the timing synchronized with the control cycle.

Further, the machine control system 1 may be configured to buffer the response information transmitted from the machine side via the wireless communication network 7 until the use timing on the controller side. In this case, the transmission of the response information from the machine side may be advanced to allow the controller side to have a margin in the period from the reception timing of the response information to the use timing of the response information. With this margin, the fluctuation of the reception timing expanded due to the wireless communication may be absorbed and the buffered response information may be used at the timing synchronized with the control cycle.

As described above, according to the configuration in which the machine side buffers the machine command up to its use timing and the controller side buffers the response information up to its use timing, acquisition of the response information, generation of the machine command by execution of the motion program based on the response information, and control of the machine 4 according to the machine command may be repeated at the control cycle.

Hereinafter, example configurations of the controller 100, the communication controller 200, and the local controller 300 will be described in more detail.

(Controller)

The controller 100 is configured to execute: receiving response information transmitted by a corresponding machine 4 (Hereinafter referred to as "subject machine 4") from the communication server 3 via the wired communication network 8; executing a motion program based on the received response information to generate a machine command for the subject machine 4; and transmitting the machine command to the communication server 3 via the wired communication network 8.

Figure 4:
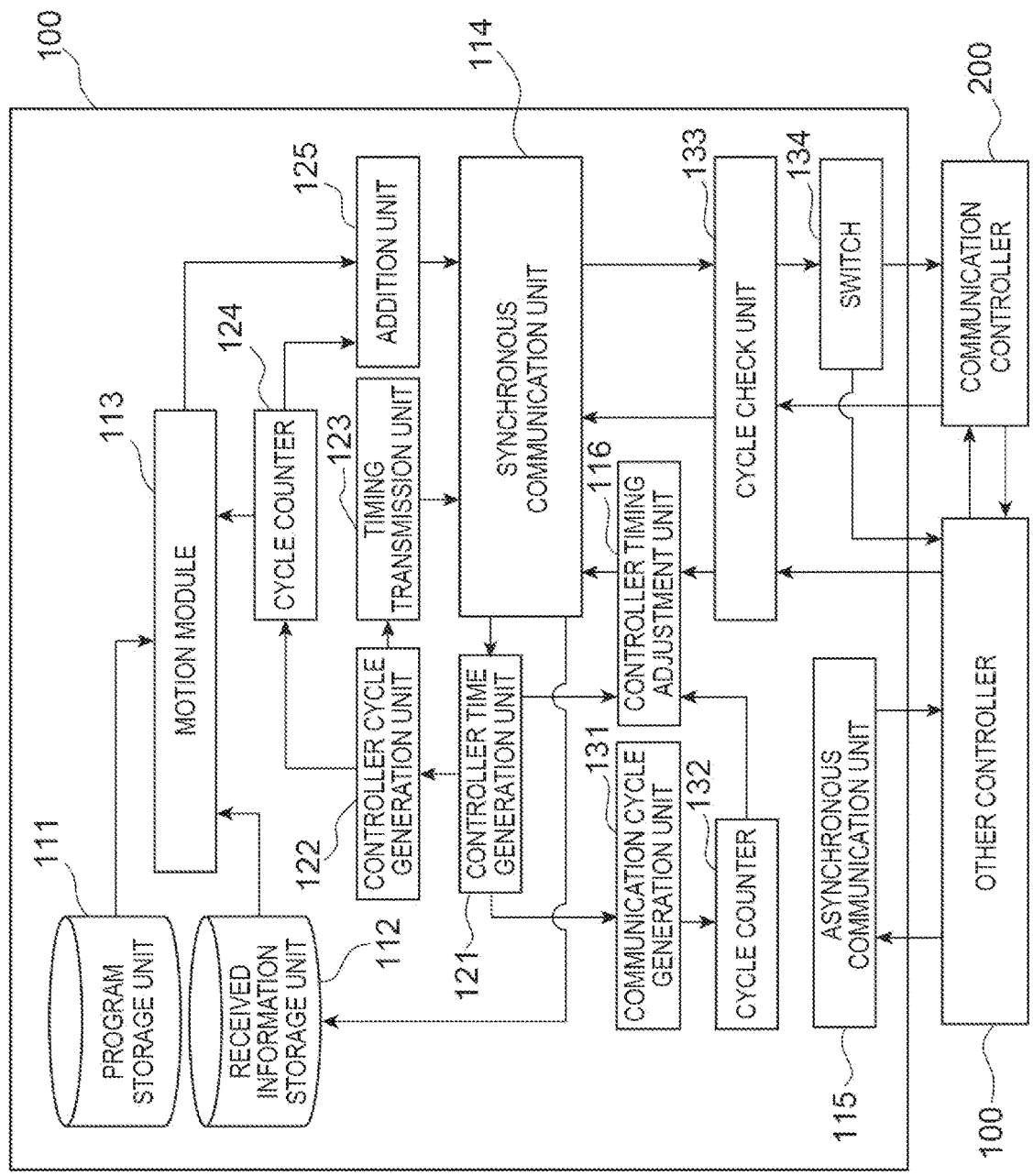
FIG. 4 is a block diagram illustrating a functional configuration of the controller.

For example, as illustrated in FIG. 4, the controller 100 includes a program storage unit 111, a received information storage unit 112, a motion module 113, a synchronous communication unit 114, an asynchronous communication unit 115, and a controller timing adjustment unit 116 as a functional configuration (Hereinafter referred to as "functional block").

The program storage unit 111 stores the motion program. The motion program includes a plurality of motion commands in chronological order. The motion command is, for example, a move command to a target position and target posture. The motion command may include a specification of an arriving time to the target position and target posture, or may include a specification of a moving speed to the target position and target posture. The motion command may be a move command at target speed. In this case, the motion command may include designation of the move period at the target speed.

The received information storage unit 112 stores received information from the communication controller 200 of the communication server 3. The received information includes the response information.

The motion module 113 is configured to execute the motion program in the control cycle to generate a machine command for the subject machine 4. Executing the motion program includes calculating the machine command so that the motion of the subject machine 4 follows the motion command. The motion module 113 may execute the motion program based on the response information stored in the received information storage unit 112. For example, the motion module 113 is configured to calculate the actual motion of the subject machine 4 based on the response information stored in the received information storage unit 112, and calculates the machine command so that the actual motion follows the motion command. Examples of the machine command include a speed command and a driving force command (Including Torque Command).

The synchronous communication unit 114 is configured to transmit the machine command to the communication controller 200 via the wired communication network 8. "Synchronous communication" means fixed-cycle communication synchronized with the control cycle. Synchronous communication includes communication that is executed in every one control cycle and communication that is executed in every predetermined number of controls. As will be described later, the machine command transmitted by the synchronous communication unit 114 is buffered in the local controller 300 of the subject machine 4 (Hereinafter referred to as "a subject local controller 300") and called at a timing synchronized with the control cycle. Therefore, the transmission itself of the machine command by the synchronous communication unit 114 may not be synchronized with the control cycle.

The asynchronous communication unit 115 is configured to transmit asynchronous communication data for the other node to the other node via the wired communication network 8 without passing through the communication controller 200. The term "asynchronous communication" means communication that does not require synchronization with the control cycle, but may be synchronized with the control cycle. The other node may be another controller 100 or a node different from the plurality of controllers 100. An example of the other node is an application server 6 (see FIG. 1). The application server 6 is a computer connected to the controller server 2 via the wired communication network 8. The application server 6 may be incorporated in the controller server 2 or in the communication server 3.

The application server 6 has a data collecting application for collecting and accumulating control information such as machine command and response information from the plurality of controllers 100. The application server 6 may further include a simulation application that simulates motion of the plurality of machines 4 on the virtual space based on the control information accumulated by the data acquisition application. The application server 6 may further include a training application that generates a trained model by machine-training based on control information accumulated by the data acquisition application. Examples of the trained model include a diagnostic model that outputs the degree of normality of the machine 4 in response to input of control information. The application server 6 may further include an analysis application that generates output information such as the degree of normality based on the control information and the trained model and transmits the output information to the controller 100. The asynchronous communication unit 115 may acquire the results of executing the simulation application, the training application, the analysis application, and the like from the application server 6 via the wired communication network 8 without passing through the communication controller 200.

The controller 100 may be configured to buffer the response information up to its use timing. For example, the controller 100 further includes the controller timing adjustment unit 116. The controller timing adjustment unit 116 is configured to store the response information received from the subject machine 4, and calls the response information in the control cycle corresponding to second cycle information added to the response information. The second cycle information is information indicating the use timing (For example, a control cycle number when the response information should be used. Hereinafter, it is referred to as "use cycle number") of the response information. The second cycle information may be the use cycle number itself or the control cycle number (Hereinafter referred to as "acquisition cycle number") of the subject local controller 300 at the timing when the response information is acquired.

When the second cycle information is the use cycle number, the controller timing adjustment unit 116 calls the response information in the control cycle in which the control cycle number is the use cycle number. Calling the response information in the control cycle in which the control cycle number is the use cycle number means calling the response information at a timing suitable for using the response information in the control cycle. Therefore, calling the response information prior to the control cycle for using in the control cycle is also included in calling the response information in the control cycle. When the second cycle information is the acquisition cycle number, the controller timing adjustment unit 116 calculates the use cycle number based on the second cycle information (for example, by adding a predetermined number), and calls the response information in the control cycle in which the control cycle number is the use cycle number.

The controller timing adjustment unit 116 is configured to output the called response information to the synchronous communication unit 114, and the synchronous communication unit 114 stores the response information in the received information storage unit 112. Accordingly, the motion module 113 of the controller 100 executes the motion program based on the response information called by the controller timing adjustment unit 116.

The controller 100 may be configured to further execute generating the control cycle and transmitting the cycle timing of the control cycle to the subject machine 4. As described later, the cycle timing is used to generate a control cycle synchronized with the control cycle in the subject machine 4. For example, the controller 100 may further include a controller time generation unit 121, a controller cycle generation unit 122, a timing transmission unit 123, and a cycle counter 124.

The controller time generation unit 121 is configured to generate the controller time in synchronization with a time (Hereinafter referred to as "global time") generated by a time server 5. The time server 5 is a computer connected to the controller server 2 via the wired communication network 8, and is configured to output global time. The time server 5 may be incorporated in the controller server 2 or in the communication server 3. For example, the controller time generation unit 121 is configured to acquire the global time received by the synchronous communication unit 114 from the time server 5 by communication that guarantees time synchronization, such as time sensitive networking (TSN) communication via the wired communication network 8, and to generate the controller time in synchronization with the acquired global time. For example, the controller time generation unit 121 adjusts the time counted by a timer 195 (described later) to the global time.

The controller cycle generation unit 122 is configured to generate a control cycle based on the controller time. For example, the controller cycle generation unit 122 is configured to set the start timing of the control cycle based on the controller time, and repeatedly generates a cycle pulse in the control cycle from the time when the controller time reaches the start timing.

The timing transmission unit 123 is configured to transmit the cycle timing of the control cycle to the subject local controller 300 via the communication controller 200. The cycle timing is information indicating the phase of the control cycle in the controller time. For example, the cycle timing is the generation timing of the cycle pulse by the controller cycle generation unit 122. The timing transmission unit 123 may transmit the start timing as the cycle timing to the subject local controller 300 before the controller cycle generation unit 122 starts generating the control cycle, or may transmit the generation timing of the second and subsequent cycle pulses as the cycle timing to the subject local controller 300 after the controller cycle generation unit 122 starts generating the control cycle. The timing transmission unit 123 may transmit the cycle timing as master timing to another controller 100. In this case, the controller cycle generation unit 122 of the other controller 100 may acquire the master timing via the wired communication network 8 and generate the control cycle based on the acquired master timing and the controller time. For example, the controller cycle generation unit 122 may set the start timing based on the acquired master timing.

When a machine timing adjustment unit 315 (described later) of the subject local controller 300 fails to generate a control cycle, the timing transmission unit 123 may retransmit a cycle timing after the previously transmitted cycle timing to the subject local controller 300. For example, the timing transmission unit 123 waits for reception of the set completion notification from the subject local controller 300, and when the controller time reaches the cycle timing without receiving the set completion notification, the machine timing adjustment unit 315 determines that the control cycle has failed to be generated. The set completion notification is a notification that the setting of the start timing in the subject local controller 300 is completed.

The cycle counter 124 is configured to count the control cycle number (for example, the number of cycle pulses) of the control cycle generated by the controller cycle generation unit 122. The motion module 113 executes the motion program based on the control cycle number counted by the cycle counter 124. For example, every time the control cycle number is counted up, the motion module 113 changes object to be executed from the currently executed motion command to the next motion command.

The controller 100 may be configured to generate a communication cycle synchronized with the control cycle. For example, the controller 100 may further include a communication cycle generation unit 131 and a cycle counter 132.

The communication cycle generation unit 131 is configured to generate a communication cycle synchronized with the control cycle. For example, the communication cycle generation unit 131 is configured to generate a communication cycle based on the controller time and the cycle timing of the control cycle. For example, the communication cycle generation unit 131 is configured to set a start timing synchronized with the start timing of the control cycle based on the cycle timing, and repeatedly generates a cycle pulse in the communication cycle from the time when the controller time reaches the start timing. The start timing synchronized with the start timing of the control cycle is a predetermined period (for example, half of the cycle length of the control cycle) with respect to the start timing of the control cycle. It includes a shifted start timing. The cycle length of the communication cycle is an integer multiple (including 1 times) of the cycle length of the control cycle. The cycle length of the communication cycle may be an integer fraction of the cycle length of the control cycle.

The cycle counter 132 is configured to count communication cycle number (for example, number of cycle pulses) of the communication cycle generated by the communication cycle generation unit 131. Since the communication cycle is generated in synchronization with the control cycle, the control cycle number can be detected based on the communication cycle number. Therefore, the controller timing adjustment unit 116 may call the response information in the control cycle in which the control cycle number becomes the use cycle number based on the communication cycle number.

The controller 100 may be configured to add information indicating the use timing of the machine command. For example, the controller 100 may further include an addition unit 125. The addition unit 125 is configured to add first cycle information to the machine command. The subject local controller 300 that receives the machine command to which the first cycle information is added detects the use timing (For example, a control cycle number when the machine command should be used. Hereinafter, it is referred to as "use cycle number") based on the first cycle information, and buffers the machine command until the use timing. For example, the addition unit 125 is configured to calculate the use cycle number based on the current control cycle number, and to add the use cycle number itself to the machine command as first cycle information. For example, the addition unit 125 is configured to calculate the use cycle number by adding a predetermined number to the current cycle number. The addition unit 125 may add the current control cycle number to the machine command as first cycle information. In this case, the subject machine 4 calculates the use cycle number based on the first cycle information (for example, by adding a predetermined number).

The controller 100 may be configured to detect a transmission delay of the machine command based on the first cycle information included in the machine command. The controller 100 may be configured to detect a reception delay of the response information based on the second cycle information included in the response information. For example, the controller 100 may further include a cycle check unit 133.

The cycle check unit 133 is configured to detect a transmission delay of the machine command based on the first cycle information included in the machine command. The transmission delay of the machine command means a delay of a level that cannot catch up with the call of the machine command by the local controller 300. For example, when the synchronous communication unit 114 transmits a machine command, the cycle check unit 133 detects a transmission delay of the machine command if the current control cycle number is equal to or larger than the use cycle number of the machine command.

The cycle check unit 133 may detect the reception delay of the response information based on the second cycle information included in the response information. The reception delay of the response information means a delay of a level that cannot catch up with the call of the response information by the controller timing adjustment unit 116. For example, after receiving the response information from the subject machine 4, the cycle check unit 133 detects the reception delay of the response information if the current control cycle number is equal to or larger than the use cycle number of the response information.

As described above, since the communication cycle is generated in synchronization with the control cycle, the control cycle number can be detected based on the communication cycle number. Therefore, the cycle check unit 133 may detect the transmission delay of the machine command based on the first cycle information and the communication cycle number, and may detect the reception delay of the response information based on the second cycle information and the communication cycle number.

The cycle check unit 133 may cancel the transmission of the machine command when a transmission delay of the machine command is detected. For example, when detecting a transmission delay of a machine command, the cycle check unit 133 discards the machine command before transmitting the machine command to the communication controller 200. The cycle check unit 133 may discard the response information when detecting a reception delay of the response information.

The synchronous communication unit 114 may transmit synchronous communication data to the controller timing adjustment unit 116 of other the controller 100 in the plurality of controllers 100 via the wired communication network 8. Examples of synchronous communication data include status information of the subject machine 4 (for example, a machine command to the subject machine 4 or response information from the subject machine 4) used to coordinate motion of the subject machine 4 with motion of a machine 4 (Hereinafter referred to as "other machine 4") to which another the controller 100 corresponds.

When the synchronous communication unit 114 transmits synchronous communication data to the controller timing adjustment unit 116 of the other the controller 100, the addition unit 125 may add first cycle information to the synchronous communication data.

The controller timing adjustment unit 116 of the other controller 100 that has received the synchronous communication data to which the first cycle information is added detects the use timing (For example, a control cycle number when the synchronous communication data should be used. Hereinafter, it is referred to as "use cycle number") of the synchronous communication data based on the first cycle information, and buffers the synchronous communication data until the use timing. For example, the addition unit 125 calculates the use cycle number based on the current control cycle number, and adds the use cycle number itself to the synchronous communication data as the first cycle information. For example, the addition unit 125 calculates the use cycle number by adding a predetermined number to the current cycle number. The addition unit 125 may add the current control cycle number (Hereinafter, referred to as "cycle number at the time of addition") to the synchronous communication data as the first cycle information.

The controller timing adjustment unit 116 of the other controller 100 stores synchronous communication data and calls the synchronous communication data in the control cycle corresponding to the first cycle information added to the synchronous communication data. When the first cycle information is the use cycle number, a controller timing adjustment unit 116 calls the synchronous communication data in the control cycle in which the control cycle number is the use cycle number. When the first cycle information is the cycle number at the time of addition, the controller timing adjustment unit 213 calculates the use cycle number based on the first cycle information (for example, by adding a predetermined number), and calls the synchronous communication data in the control cycle in which the control cycle number is the use cycle number.

The controller timing adjustment unit 116 is configured to output the called synchronous communication data to the synchronous communication unit 114, and the synchronous communication unit 114 stores the synchronous communication data in the received information storage unit 112. Accordingly, the motion module 113 of the other controller 100 executes the motion program based on the response information called by the controller timing adjustment unit 116.

As described above, the synchronous communication data is buffered in the controller timing adjustment unit 116 of the other controller 100 and called at a timing synchronized with the control cycle. Therefore, the transmission of the synchronous communication data by the synchronous communication unit 114 itself may not be synchronized with the control cycle.

When the synchronous communication unit 114 transmits synchronous communication data addressed to another the other controller 100, the cycle check unit 133 may detect a transmission delay of the synchronous communication data based on the first cycle information included in the synchronous communication data. The transmission delay of the synchronous communication data means a delay of a level that cannot catch up with the call of the synchronous communication data by the controller timing adjustment unit 116 of the other controller 100. For example, when the synchronous communication unit 114 transmits synchronous communication data, if the control cycle number corresponding to the current communication cycle number is equal to or greater than the use cycle number of the synchronous communication data, the cycle check unit 133 detects a transmission delay of the synchronous communication data. The cycle check unit 133 may cancel the transmission of the synchronous communication data when the transmission delay of the synchronous communication data is detected.

The cycle check unit 133 of the other controller 100 may detect the reception delay of the synchronous communication data based on the first cycle information included in the synchronous communication data. The reception delay of the synchronous communication data means a delay of a level that cannot catch up with the call of the synchronous communication data by the controller timing adjustment unit 116. For example, when the cycle check unit 133 receives the synchronous communication data addressed to the controller timing adjustment unit 116, if the current control cycle number is equal to or larger than the use cycle number of the synchronous communication data, the reservation unit detects the reception delay of the synchronous communication data. The cycle check unit 133 may discard the synchronous communication data when detecting a reception delay of the synchronous communication data.

The controller 100 may be configured to switch the data transmission destination based on whether the synchronous communication unit 114 is addressed to the subject machine 4 or another the controller 100. For example, the controller 100 includes a switch 134.

The switch 134 is configured to transmit the information to the subject local controller 300 via the communication server 3 when the information transmitted by the synchronous communication unit 114 is addressed to the subject machine 4, and to transmit the information to the controller timing adjustment unit 116 of the other controller 100 via the wired communication network 8 when the information is addressed to the other controller 100.

(Local Controller)

Figure 5:
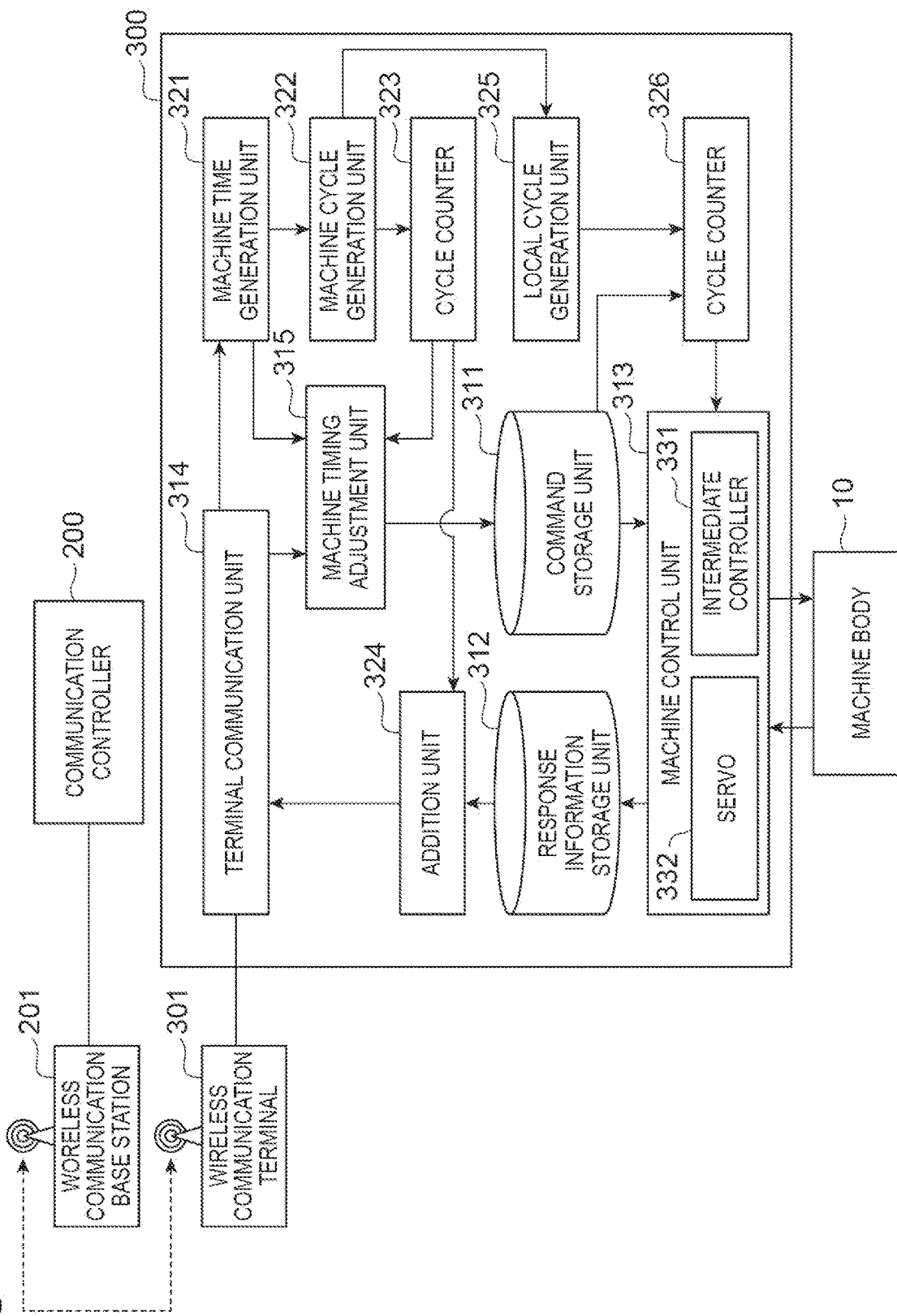
FIG. 5 is a block diagram illustrating a functional configuration of a local controller.

The local controller 300 is configured to execute receiving a machine command via the communication server 3 and causing the machine body 10 to execute motion based on the machine command. For example, as illustrated in FIG. 5, the local controller 300 includes a terminal communication unit 314, the machine timing adjustment unit 315, a command storage unit 311, a machine control unit 313, and a response information storage unit 312 as functional blocks.

The terminal communication unit 314 is configured to receive the machine command from the communication server 3 via the wireless communication network 7. The command storage unit 311 is configured to store the machine command received by the terminal communication unit 314. The machine control unit 313 is configured to cause the machine body 10 to execute motion based on the machine command stored in the command storage unit 311, to acquires response information based on the motion executed by the machine body 10, and to store the response information in the response information storage unit 312.

For example, the machine control unit 313 is configured to cause the operation of the machine body 10 to follow the machine command. For example, the machine control unit 313 is configured to drive the machine body 10 so as to reduce a deviation between the machine command stored in the command storage unit 311 and the past response information stored in the response information storage unit 312, to acquire the response information of the machine body 10, and to store the acquired response information in the response information storage unit 312. For example, when the machine command is a speed command, the machine control unit 313 drives the machine body 10 so that the operation speed indicated by the response information stored in the response information storage unit 312 follows the speed command. When the machine command is a driving force command, the machine control unit 313 drives the machine body 10 so that the driving force indicated by the response information stored in the response information storage unit 312 follows the driving force command.

The machine control unit 313 may control the machine body 10 in a machine cycle having a cycle length shorter than the control cycle. In each machine cycle, the machine control unit 313 drives the machine body 10 so as to reduce the deviation between the machine command and the past response information stored in the response information storage unit 312, acquires the response information of the machine body 10, and stores the response information in the response information storage unit 312. The cycle length of the machine cycle is, for example, integer fraction of the cycle length of the control cycle.

For example, the machine control unit 313 includes an intermediate controller 331 and a servo 332. The intermediate controller 331 is configured to generate drive data (for example, a position command, a speed command, or a driving force command) for each actuator of the machine body 10 in the machine cycle so as to reduce deviation between the machine command and past response information stored in the response information storage unit 312. The servo 332 is configured to output driving power to each actuator of the machine body 10 based on the drive data. The servo 332 may output the driving power based on the drive data in a servo cycle having a cycle length shorter than the machine cycle. The machine control unit 313 may include at least one of the intermediate controller 331 and the servo 332. If the machine control unit 313 does not have the servo 332, the machine control unit 313 outputs the drive data to the machine body 10, and the machine body 10 generates the driving power of each actuator based on the drive data. If the machine control unit 313 does not have the intermediate controller 331, the controller 100 generates the drive data as a machine command and transmits it to the subject machine 4.

For example, when the machine body 10 is the mobile robot 20 or the stationary robot 30, the intermediate controller 331 may acquire the machine command including a target position, a target posture, a target speed, and the like of the tip portion 36, and generate the drive data including position commands and speed commands for the actuators 41, 42, 43, 44, 45, 46 by inverse kinematics calculation. The intermediate controller 331 may obtain the machine command including target positions and target speeds for the actuators 41, 42, 43, 44, 45, 46, and the intermediate controller may generate drive data including driving force commands for the actuators 41, 42, 43, 44, 45, 46. The intermediate controller 331 may generate drive data based on a plurality of machine commands arranged in time series.

The terminal communication unit 314 is configured to transmit the response information stored in the response information storage unit 312 to the communication server 3 via the wireless communication network 7 in each control cycle.

The local controller 300 may be configured to buffer the machine command up to its use timing. For example, the local controller 300 further includes the machine timing adjustment unit 315.

The machine timing adjustment unit 315 is configured to store the machine command received by the terminal communication unit 314 and calls the machine command in the control cycle corresponding to the first cycle information added to the machine command. When the first cycle information is the use cycle number, the machine timing adjustment unit 315 calls the machine command in the control cycle in which the control cycle number is the use cycle number. Calling the machine command in the control cycle in which the control cycle number is the use cycle number means calling the machine command at a timing suitable for using the response information in the control cycle. Therefore, calling the machine command prior to the control cycle for using in the control cycle is also included in calling the machine command in the control cycle. When the first cycle information is the cycle number at the time of addition, the machine timing adjustment unit 315 calculates the use cycle number based on the first cycle information (for example, by adding a predetermined number), and calls the machine command in the control cycle in which the control cycle number becomes the use cycle number.

The machine timing adjustment unit 315 is configured to store the called machine command in the command storage unit 311. Thus, the control of the machine body 10 by the machine control unit 313 is performed based on the machine command called by the machine timing adjustment unit 315.

The local controller 300 may be configured to generate a control cycle synchronized to a control cycle in the corresponding controller 100. For example, the local controller 300 may further include a machine time generation unit 321, a machine cycle generation unit 322, and a cycle counter 323.

The machine time generation unit 321 is configured to generate machine time in synchronization with the global time. For example, the machine time generation unit 321 is configured to acquire the global time received by the terminal communication unit 314 from the communication server 3 by communication that guarantees time synchronization, such as TSN communication via the wireless communication network 7, and to generate machine time in synchronization with the acquired global time. The machine time generation unit 321 may acquire the global time from the time server 5 or the corresponding controller 100 via the wired communication network 8. For example, the machine time generation unit 321 is configured to adjust the time counted by a timer 395 (described later) to the global time.

The machine cycle generation unit 322 is configured to acquire the cycle timing received by the terminal communication unit 314 from the communication server 3 via the wireless communication network 7, and to generate a control cycle synchronized with the control cycle in the corresponding the controller 100 based on the acquired cycle timing. For example, the machine cycle generation unit 322 is configured to generate the control cycle based on the machine time and the cycle timing. For example, the machine cycle generation unit 322 is configured to set a start timing synchronized with the start timing of the control cycle in the corresponding the controller 100 based on the cycle timing, and repeatedly generates a cycle pulse in the control cycle from the time when the machine time reaches the start timing. The machine cycle generation unit 322 may transmit a set completion notification to the controller 100 when the setting of the start timing is completed. The cycle length of the control cycle generated by the machine cycle generation unit 322 is the same as the cycle length of the control cycle in the controller 100.

The cycle counter 323 is configured to count the control cycle number (for example, the number of cycle pulses) of the control cycle generated by the machine cycle generation unit 322.

The local controller 300 may be configured to add information indicating the use timing of the response information transmitted from the terminal communication unit 314 to the communication server 3. For example, the local controller 300 may further include an addition unit 324. The addition unit 324 is configured to add the second cycle information to the response information. As described above, the response information transmitted by the terminal communication unit 314 is buffered in the controller timing adjustment unit 116 of the corresponding controller 100 and called at a timing synchronized with the control cycle. Therefore, the transmission itself of the response information by the terminal communication unit 314 may not be synchronized with the control cycle.

The local controller 300 may be configured to generate the machine cycle synchronized with the control cycle. For example, the local controller 300 further includes a local cycle generation unit 325 and a cycle counter 326.

The local cycle generation unit 325 is configured to generate the machine cycle based on the machine time and the cycle timing. For example, the local cycle generation unit 325 is configured to set the start timing synchronized with the start timing of the control cycle in the corresponding controller 100 based on the cycle timing, and to repeatedly generate a cycle pulse in the machine cycle from the time when the machine time reaches the start timing.

The cycle counter 326 is configured to count the machine cycle number (for example, the number of cycle pulses) of the machine cycle generated by the local cycle generation unit 325.

(Communication Controller)

Figure 6:
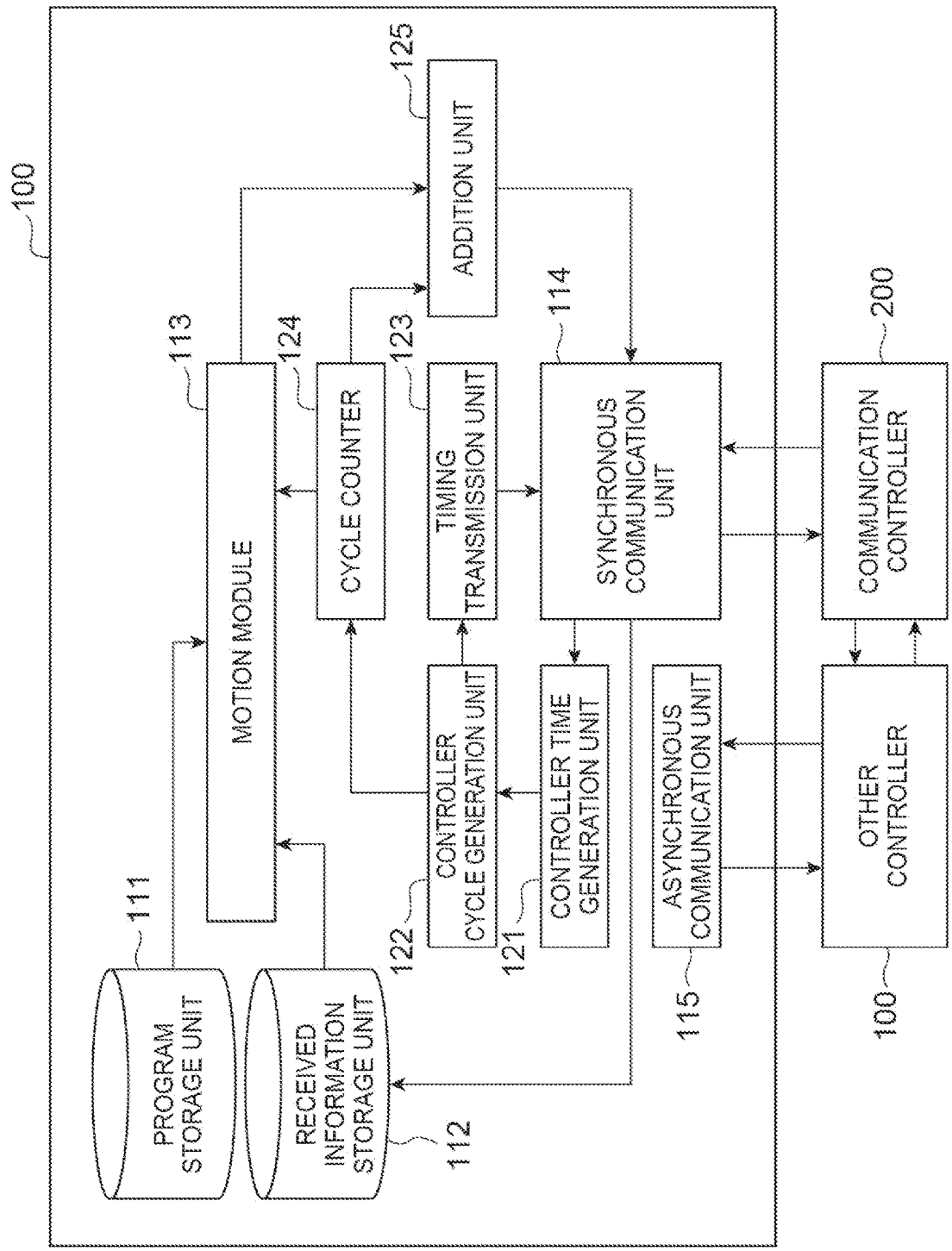
FIG. 6 is a block diagram illustrating a modification of the controller.
Figure 7:
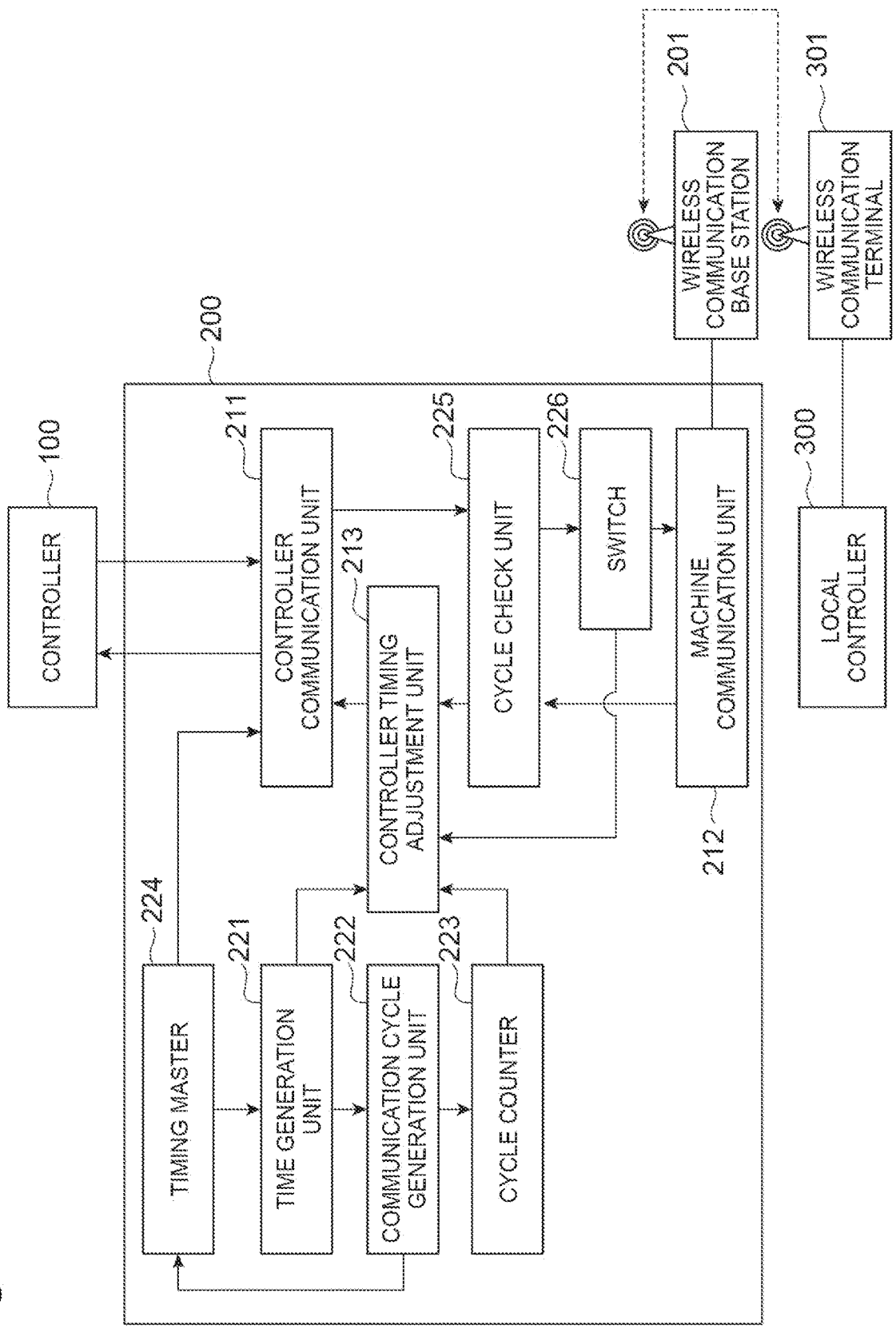
FIG. 7 is a block diagram illustrating a functional configuration of the communication controller.

The controller timing adjustment unit 116, the communication cycle generation unit 131, the cycle counter 132, the cycle check unit 133, and the switch 134 may be provided at least between the controller 100 and the communication controller 200 (including in the controller 100 and in the communication controller 200), and may not be provided in the controller 100. Hereinafter, an example configuration in which a controller timing adjustment unit, a communication cycle generation unit, a cycle counter, a cycle check unit, and a switch are provided in the communication controller 200 will be described. In this case, as shown in FIG. 6, the controller 100 may not include the controller timing adjustment unit 116, the communication cycle generation unit 131, the cycle counter 132, the cycle check unit 133, and the switch 134. As shown in FIG. 7, the communication controller 200 includes a controller communication unit 211, a machine communication unit 212, and the controller timing adjustment unit 213 as functional blocks.

The controller communication unit 211 is configured to receive the machine command or synchronous communication data from each of the plurality of controllers 100 via the wired communication network 8, and to transmit the response information or synchronous communication data to each of the controller 100 via the wired communication network 8.

The machine communication unit 212 is configured to transmit the machine command to each of the plurality of the local controller 300 via the wireless communication network 7, and to acquire response information from each of the plurality of local controllers 300 via the wireless communication network 7.

The controller timing adjustment unit 213 is configured to store the response information acquired by the machine communication unit 212, and calls the response information in the control cycle corresponding to the second cycle information added to the response information. When the second cycle information is the use cycle number, the controller timing adjustment unit 213 calls the response information in the control cycle in which the control cycle number is the use cycle number. Calling the response information in the control cycle in which the control cycle number is the use cycle number means calling the response information at a timing suitable for using the response information in the control cycle. Therefore, calling the response information prior to the control cycle for using in the control cycle is also included in calling the response information in the control cycle. When the second cycle information is the acquisition cycle number, the controller timing adjustment unit 213 calculates the use cycle number based on the second cycle information (for example, by adding a predetermined number), and calls the response information in the control cycle in which the control cycle number is the use cycle number.

The controller communication unit 211 is configured to transmit the response information called by the controller timing adjustment unit 213 to the corresponding controller 100 via the wired communication network 8. The synchronous communication unit 114 of the corresponding controller 100 stores the received response information in the received information storage unit 112. Accordingly, the motion module 113 of the corresponding the controller 100 executes the motion program based on the response information called by the controller timing adjustment unit 213.

The communication controller 200 may be configured to generate a communication cycle synchronized with at least one control cycle of the plurality of controllers 100. For example, the communication controller 200 may further include a time generation unit 221, a communication cycle generation unit 222, and a cycle counter 223.

The time generation unit 221 is configured to generate a communication server time in synchronization with the global time. For example, the time generation unit 221 is configured to acquire the global time received by the controller communication unit 211 from the time server 5 by communication that guarantees time synchronization, such as TSN communication via the wired communication network 8, and to generate the communication server time in synchronization with the acquired global time. For example, the time generation unit 221 is configured to adjust the time counted by a timer 296 (described later) to the global time. When the time server 5 is incorporated in the communication server 3, the time generation unit 221 uses the global time itself as the communication server time.

The communication cycle generation unit 222 is configured to generate a communication cycle synchronized with at least one control cycle of the plurality of controllers 100. For example, the communication cycle generation unit 222 is configured to generate the communication cycle based on the communication server time and the cycle timing transmitted to the subject local controller 300 by at least one of the plurality of controllers 100. For example, the communication cycle generation unit 222 is configured to set a start timing synchronized with the start timing of the control cycle based on the cycle timing, and to repeatedly generate a cycle pulse in the communication cycle from the time when the communication server time reaches the start timing. The start timing synchronized with the start timing of the control cycle is a predetermined period (for example, half of the cycle length of the control cycle) with respect to the start timing of the control cycle. It includes a shifted start timing.

The communication cycle generation unit 222 may transmit a set completion notification to the controller 100 when the setting of the start timing is completed. The cycle length of the communication cycle is an integer multiple (including 1 times) of the cycle length of the control cycle. The cycle length of the communication cycle may integer fraction of the cycle length of the control cycle.

The cycle counter 223 is configured to count the communication cycle number (for example, the number of cycle pulses) of the communication cycle generated by the communication cycle generation unit 222. Since the communication cycle is generated in synchronization with the control cycle, the control cycle number can be detected based on the communication cycle number. Therefore, the controller timing adjustment unit 213 may call the response information in the control cycle in which the control cycle number becomes the use cycle number based on the communication cycle number.

The communication controller 200 may be configured to generate the master timing. For example, the communication controller 200 may include a timing master 224. The timing master 224 is configured to generate master timing based on the communication server time. The timing master 224 is configured to transmit the generated master timing to at least one of the plurality of controllers 100 via the wired communication network 8.

When the communication controller 200 has the timing master 224 and at least one of the plurality of controllers 100 generates the control cycle based on the master timing, the communication cycle generation unit 222 generates the communication cycle based on the communication server time and the master timing. For example, the communication cycle generation unit 222 may set the start timing based on the master timing. The generation of the control cycle in at least one of the plurality of controllers 100 and the generation of the communication cycle in the communication controller 200 are performed based on the same master timing, so that the communication cycle is synchronized with the control cycle.

The communication controller 200 may be configured to detect a transmission delay of the machine command based on the first cycle information included in the machine command. The communication controller 200 may be configured to detect a reception delay of the response information based on the second cycle information included in the response information. For example, the communication controller 200 may further include a cycle check unit 225.

The cycle check unit 225 is configured to detect the transmission delay of the machine command based on the first cycle information included in the machine command. The transmission delay of the machine command means a delay of a level that cannot catch up with the call of the machine command by the local controller 300. For example, the cycle check unit 225 detects the transmission delay of the machine command when the control cycle number corresponding to the current communication cycle number is equal to or larger than the use cycle number of the machine command before the machine communication unit 212 transmits the machine command to the local controller 300.

The cycle check unit 225 may detect the reception delay of the response information based on the second cycle information included in the response information. The reception delay of the response information means a delay of a level that cannot catch up with the call of the response information by the controller timing adjustment unit 213. For example, after the machine communication unit 212 receives the response information from the machine 4, the cycle check unit 225 detects the reception delay of the response information when the control cycle number corresponding to the current communication cycle number is equal to or larger than the use cycle number of the response information.

As described above, since the communication cycle is generated in synchronization with the control cycle, the control cycle number can be detected based on the communication cycle number. Therefore, the cycle check unit 225 may detect the transmission delay of the machine command based on the first cycle information and the communication cycle number, and may detect the reception delay of the response information based on the second cycle information and the communication cycle number.

The cycle check unit 225 may cancel the transmission of the machine command by the machine communication unit 212 when detecting the transmission delay of the machine command. For example, when detecting a transmission delay of a machine command, the cycle check unit 225 discards the machine command before the machine communication unit 212 transmits the machine command. The cycle check unit 225 may discard the response information when detecting the reception delay of the response information.

The communication controller 200 may be configured to switch the data transmission destination based on whether the data received from the controller 100 is addressed to the subject machine 4 or the other controller 100. In this case, the controller 100 may be configured to add destination to the data to be transmitted to the communication controller 200. For example, the communication controller 200 includes a switch 226.

The switch 226 is configured to cause the machine communication unit 212 to transmit data received from one controller 100 by the controller communication unit 211 to the subject local controller 300 via the wireless communication network 7 if the data is addressed to the subject machine 4, and to cause the controller communication unit 211 to transmit the data to the other controller 100 via the wired communication network 8 if the data is addressed to the other controller 100.

When the switch 226 causes the controller communication unit 211 to send synchronous communication data to the other controller 100, the controller timing adjustment unit 213 stores the synchronous communication data and calls the synchronous communication data in the control cycle corresponding to the first cycle information added to the synchronous communication data. When the first cycle information is the use cycle number, the controller timing adjustment unit 213 calls the synchronous communication data in the control cycle in which the control cycle number is the use cycle number. When the first cycle information is the cycle number at the time of addition, the controller timing adjustment unit 213 calculates the use cycle number based on the first cycle information (for example, by adding a predetermined number), and calls the synchronous communication data in the control cycle in which the control cycle number is the use cycle number.

The controller communication unit 211 is configured to transmit the synchronous communication data called by the controller timing adjustment unit 213 to the addressed controller 100 via the wired communication network 8. The synchronous communication unit 114 of the other the controller 100 stores the received synchronous communication data in the received information storage unit 112. Accordingly, the motion module 113 of the other the controller 100 executes the motion program based on the synchronous communication data called by the controller timing adjustment unit 213.

When the controller communication unit 211 receives synchronous communication data addressed to the other controller 100 from the controller 100, the cycle check unit 225 may detect the reception delay of the synchronous communication data based on the first cycle information included in the synchronous communication data. The reception delay of the synchronous communication data means a delay of a level that cannot catch up with the call of the synchronous communication data by the controller timing adjustment unit 213. For example, after the controller communication unit 211 receives the synchronous communication data from the controller 100, the cycle check unit 225 detects the reception delay of the synchronous communication data when the control cycle number corresponding to the current communication cycle number is greater than or equal to the use cycle number of the synchronous communication data. The cycle check unit 225 may discard the synchronous communication data when detecting a reception delay of the synchronous communication data.

Figure 8:
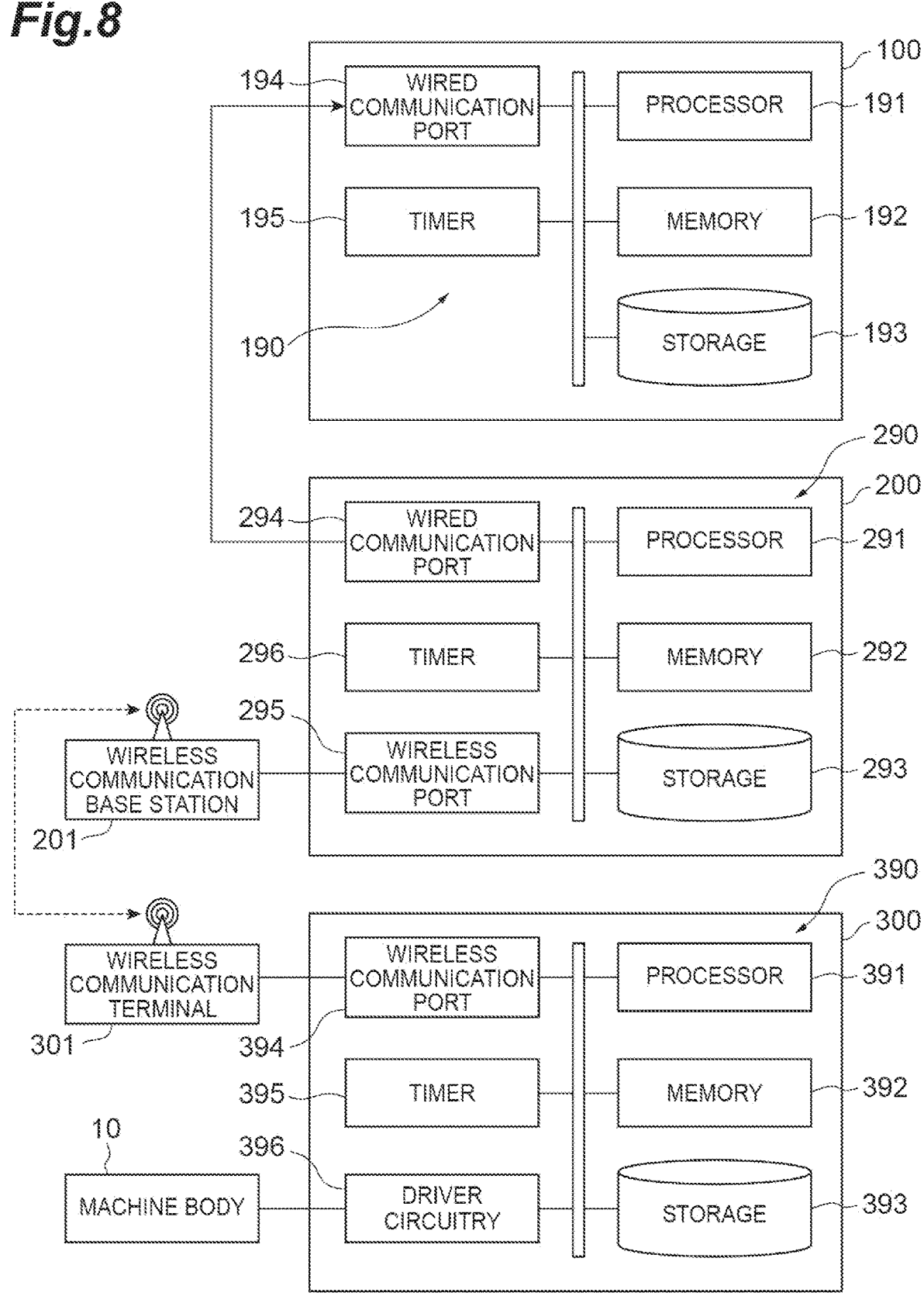
FIG. 8 is a block diagram illustrating a hardware configuration of a controller server, a communication controller, and a local controller.

FIG. 8 is a block diagram illustrating a hardware configuration of the controller server 2, the communication controller 200, and the local controller 300. As shown in FIG. 8, the controller 100 includes a circuitry 190. The circuitry 190 includes a processor 191, a memory 192, a storage 193, a wired communication port 194, and the timer 195. The number of each constituent element of the circuitry 190 is not limited to one.

The storage 193 stores a program for causing the controller server 2 to execute receiving the response information transmitted by the subject machine 4 from the communication server 3 via the wired communication network 8, executing the motion program based on the received response information to generate the machine command for the subject machine 4, and transmitting the machine command to the communication server 3 via the wired communication network 8. The control method executed by the controller server 2 according to the program may further include storing the received response information and calling the response information in the control cycle corresponding to the second cycle information added to the response information. In this case, executing the motion program based on the received response information includes executing the motion program based on the response information called in the control cycle corresponding to the second cycle information. For example, the storage 193 stores the program for configuring each functional block of the controller 100 in the controller server 2.

The memory 192 temporarily stores the program loaded from the storage 193. The processor 191 executes the program loaded in the memory 192 while temporarily storing the operation result in the memory 192. The wired communication port 194 communicates with the communication controller 200 via the wired communication network 8 in response to a command from the processor 191. The timer 195 measures elapsed time by counting clock pulses.

The communication controller 200 has a circuitry 290. The circuitry 290 includes a processor 291, a memory 292, a storage 293, a wired communication port 294, a wireless communication port 295, and the timer 296.

The storage 293 stores a program for causing the communication controller 200 to execute a communication method including receiving machine commands from each of the plurality of controllers 100 via the wired communication network 8, transmitting the machine commands to each of the plurality of machines 4 via the wireless communication network 7, receiving response information from each of the plurality of machines 4 via the wireless communication network 7, and transmitting response information to each of the plurality of controllers 100 via the wired communication network 8. The communication method executed by the communication controller 200 by the program may further include storing the received response information, and calling the response information in the control cycle corresponding to the second cycle information added to the response information. In this case, transmitting the response information via the wired communication network 8 includes transmitting the response information called in the control cycle corresponding to the second cycle information. For example, the storage 293 stores the program for configuring each functional block described above in the communication controller 200.

The memory 292 temporarily stores the program loaded from the storage 293. The processor 291 executes the program loaded in the memory 292 while temporarily storing the operation result in the memory 292. The wired communication port 294 communicates with the controller server 2 via the wired communication network 8 in response to a command from the processor 291. The wireless communication port 295 communicates with the local controller 300 via the wireless communication base station 201 and the wireless communication terminal 301 in response to a command from the processor 291. The timer 296 measures elapsed time by counting clock pulses.

The local controller 300 has a circuitry 390. The circuitry 390 includes a processor 391, a memory 392, a storage 393, a wireless communication port 394, the timer 395, and a driver circuitry 396.

The storage 393 stores a program for causing the local controller 300 to execute a control method including receiving a machine command via the communication server 3 and causing the machine body 10 to execute motion based on the machine command. The control method executed by the local controller 300 according to the program may further include storing the received machine command, and calling the machine command in the control cycle corresponding to the first cycle information added to the machine command. In this case, causing the machine body 10 to execute motion according to the machine command includes causing the machine body 10 to execute motion according to the machine command called in the control cycle corresponding to the first cycle information. For example, the local controller 300 stores the program for configuring each functional block described above in the local controller 300.

The memory 392 temporarily stores the program loaded from the storage 393. The processor 391 executes the program loaded in the memory 392 while temporarily storing the operation result in the memory 392. The wireless communication port 394 communicates with the communication controller 200 via the wireless communication terminal 301 and the wireless communication base station 201 in response to a command from the processor 391. The timer 395 measures elapsed time by counting clock pulses. The driver circuitry 396 supplies driving power to the machine body 10 in response to a command from the processor 391.

[machine control procedure] Next, a machine control procedure executed by the machine control system 1 will be described as an example of the machine control method. This procedure includes a cycle generation procedure such as a control cycle and a communication cycle, and a machine control procedure in the generated cycle.

(Outline of Cycle Generation Procedure)

The cycle generation procedure includes the controller 100 generating a control cycle and the local controller 300 generating a control cycle synchronized with the control cycle.

Figure 9:
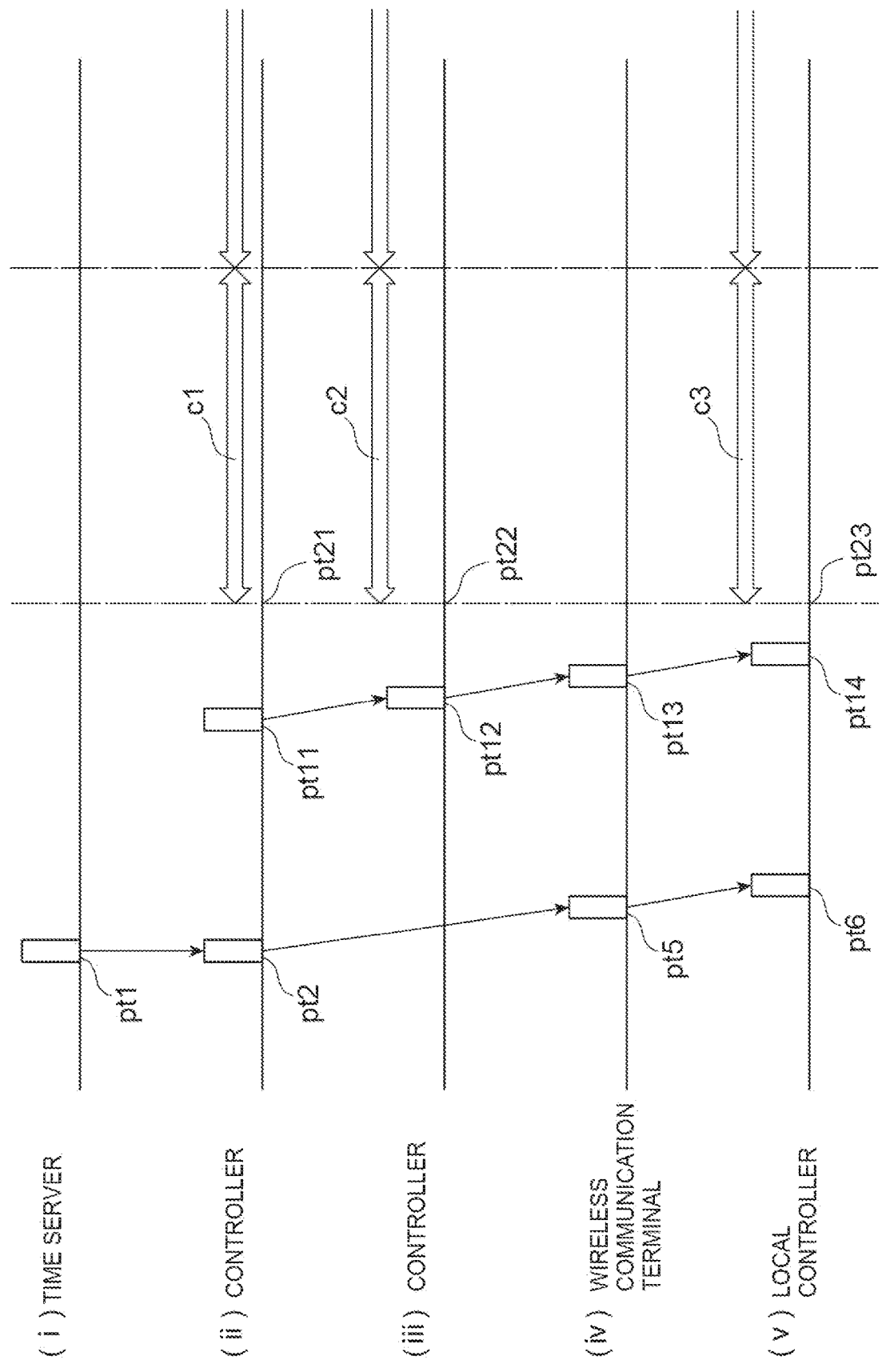
FIG. 9 is a timing chart illustrating a cycle generation procedure.

FIG. 9 is a timing chart illustrating the outline of the cycle generation procedure, and the horizontal axis of each chart represents elapsed time. (i) indicates an information process timing in the time server 5, (ii) indicates an information process timing of control cycle generation in the controller 100, (iii) indicates an information process timing of communication cycle generation in the controller 100, (iv) indicates an information process timing in the wireless communication terminal 301, and (v) indicates an information process timing in the local controller 300.

First, in time pt1, the time server 5 transmits the global time to the controller 100. The controller 100 receives the global time in time pt2 and generates the controller time synchronized with the received global time. The wireless communication terminal 301 receives the global time in time pt5, and the local controller 300 generates the machine time synchronized with the global time received by the wireless communication terminal 301 in time pt6.

The controller 100 sets the start timing of the control cycle in time pt11 and sets the start timing of the communication cycle in time pt12 based on the controller time. The wireless communication terminal 301 receives the cycle timing from the communication controller 200 via the wireless communication base station 201 in time pt13, and the local controller 300 sets a start timing synchronized with the start timing in time pt14 based on the cycle timing received by the wireless communication terminal 301.

Thereafter, the controller 100 starts generating control cycle c1 in time pt21 corresponding to the start timing, starts generating communication cycle c2 in time pt22 corresponding to the start timing, and the local controller 300 starts generating control cycle c3 in time pt23 corresponding to the start timing. This completes the cycle generation procedure.

Hereinafter, the control cycle and communication cycle generation procedure executed by the controller 100 and the control cycle generation procedure executed by the local controller 300 in the cycle generation procedure will be described in detail.

(Cycle Generation Procedure in Controller)

Figure 10:
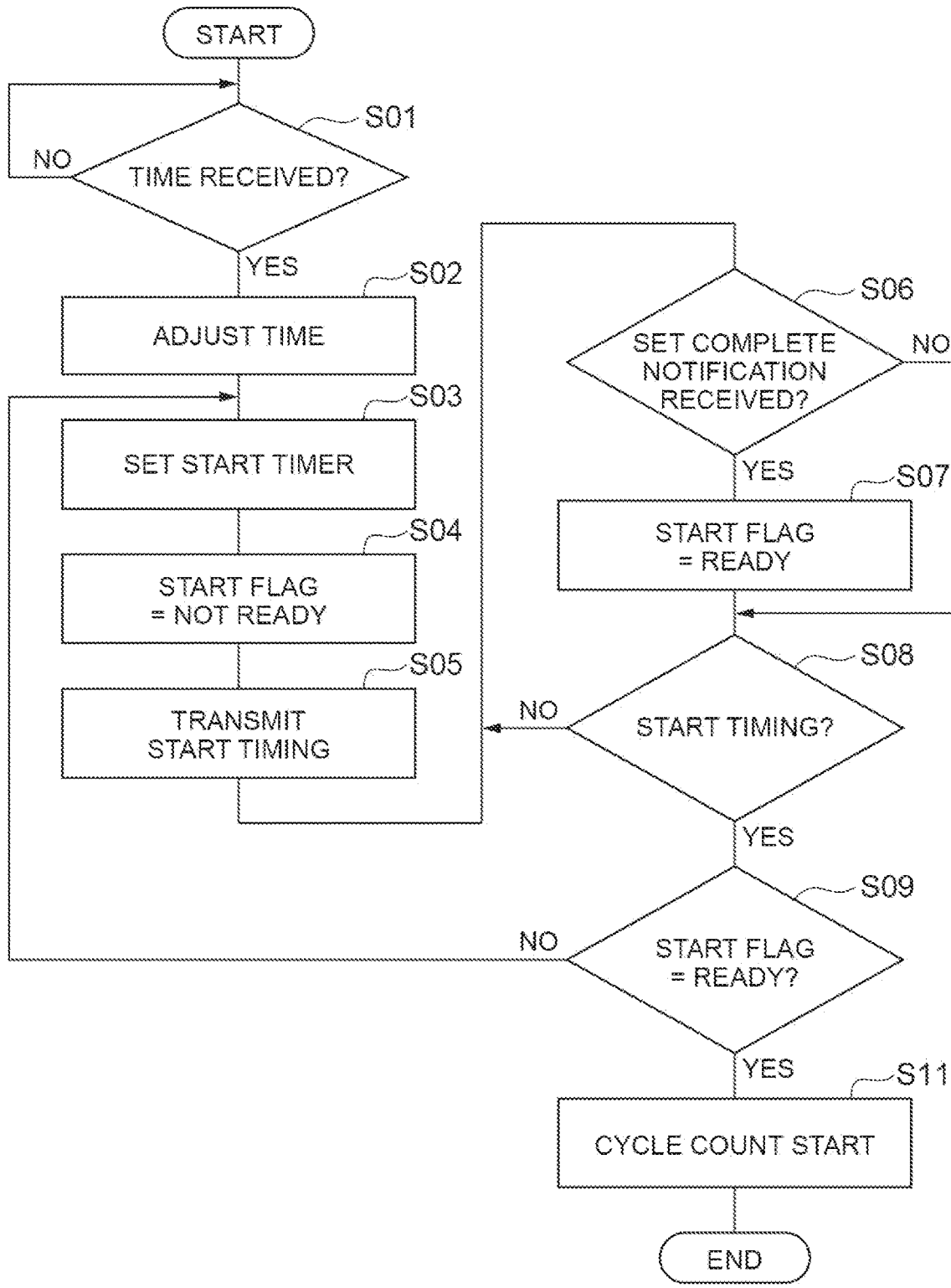
FIG. 10 is a flowchart illustrating a cycle generation procedure in the controller.

FIG. 10 is a flowchart illustrating a cycle generation procedure in the controller 100. As shown in FIG. 10, the controller 100 first executes operations S01, S02, S03, S04, S05. In a operation S01, the controller time generation unit 121 waits for the synchronous communication unit 114 to receive the global time. In a operation S02, the controller time generation unit 121 generates the controller time in synchronization with the global time received by the synchronous communication unit 114. In a operation S03, the controller cycle generation unit 122 sets the start timing of the control cycle based on the controller time. The communication cycle generation unit 131 sets the start timing of the communication cycle based on the controller time. In a operation S04, the controller cycle generation unit 122 sets the start flag of the control cycle to "start impossible". In a operation S05, the timing transmission unit 123 transmits the cycle timing (for example, the start timing) of the control cycle to the subject local controller 300 via the communication server 3. The timing transmission unit 123 may transmit the cycle timing as master timing to the other controller 100.

Next, the controller 100 executes a operation S06. In the operation S06 the timing transmission unit 123 checks whether the set completion notification has been received from the subject local controller 300. If it is determined in the operation S06 that the set completion notification is received from the local controller 300, the controller 100 executes a operation S07. In the operation S07, the controller cycle generation unit 122 sets the start flag of the control cycle to "startable".

Next, the controller 100 executes a operation S08. When it is determined, in the operation S06, that the setting completion notification has not been received from the subject local controller 300, the controller 100 executes the operation S08 without executing the operation S07. In the operation S08, the controller cycle generation unit 122 checks whether the controller time has reached the start timing.

If, in the operation S08, it is determined that the controller time has not reached the start timing, the controller 100 returns the processing to the operation S06. Thereafter, the reception confirmation of the set completion notification is repeated until the control-side time reaches the start timing.

If, in the operation S08, it is determined that the controller time has reached the start timing, the controller 100 executes a operation S09. In the operation S09, the controller cycle generation unit 122 checks whether or not the start flag is "startable".

If it is determined in the operation S09 that the start flag is not "startable", the controller 100 returns the processing to the operation S03. As a result, the processing after the setting of the start timing is executed again. If it is determined in the operation S09 that the start flag is "startable", the controller 100 executes a operation S11. In the operation S11, the controller cycle generation unit 122 starts generating the control cycle, and the timing transmission unit 123 starts counting the control cycle number. In addition, the communication cycle generation unit 131 starts generating the communication cycle, and the cycle counter 132 starts counting the communication cycle. This completes the control cycle generation procedure in the controller 100. In the operation S11, the communication cycle generation unit 131 may start generating the communication cycle at a timing different from the timing at which the controller cycle generation unit 122 starts generating the control cycle.

(Control Cycle Generation Procedure in Local Controller)

Figure 11:
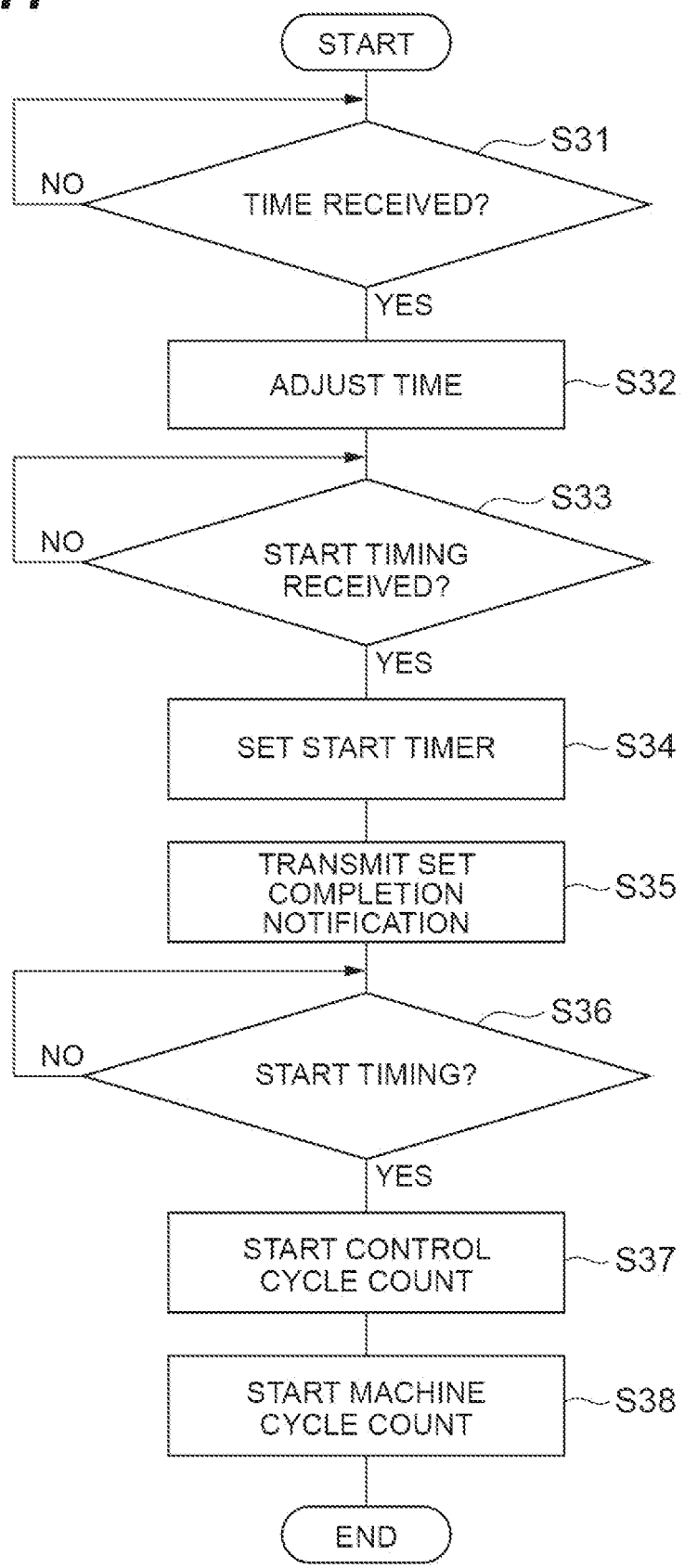
FIG. 11 is a flowchart illustrating a cycle generation procedure in the local controller.

FIG. 11 is a flowchart illustrating a cycle generation procedure in the local controller 300. As shown in FIG. 11, the local controller 300 first executes operations S31, S32, S33. In a operation S31, the machine time generation unit 321 waits for the terminal communication unit 314 to receive the global time. In a operation S32, the machine time generation unit 321 generates machine time in synchronization with the global time received by the terminal communication unit 314. In a operation S33, the machine cycle generation unit 322 waits for the terminal communication unit 314 to receive the cycle timing (for example, the start timing) transmitted by the corresponding the controller 100.

Next, the local controller 300 executes operations S34, S35, S36, S37, S38. In a operation S34, the machine cycle generation unit 322 sets the start timing synchronized with the start timing of the control cycle in the corresponding controller 100 based on the cycle timing received by the terminal communication unit 314. In a operation S35, the machine cycle generation unit 322 transmits a set completion notification to the controller 100. In a operation S36, the machine cycle generation unit 322 waits for machine time to reach start timing. In a operation S37, the machine cycle generation unit 322 starts generating the control cycle, and the cycle counter 323 starts counting the control cycle number. In a operation S38, the local cycle generation unit 325 starts generating machine cycles, and the cycle counter 326 starts counting machine cycle numbers. This completes the control cycle generation procedure in the local controller 300.

(Modification of Cycle Generation Procedure)

Figure 12:
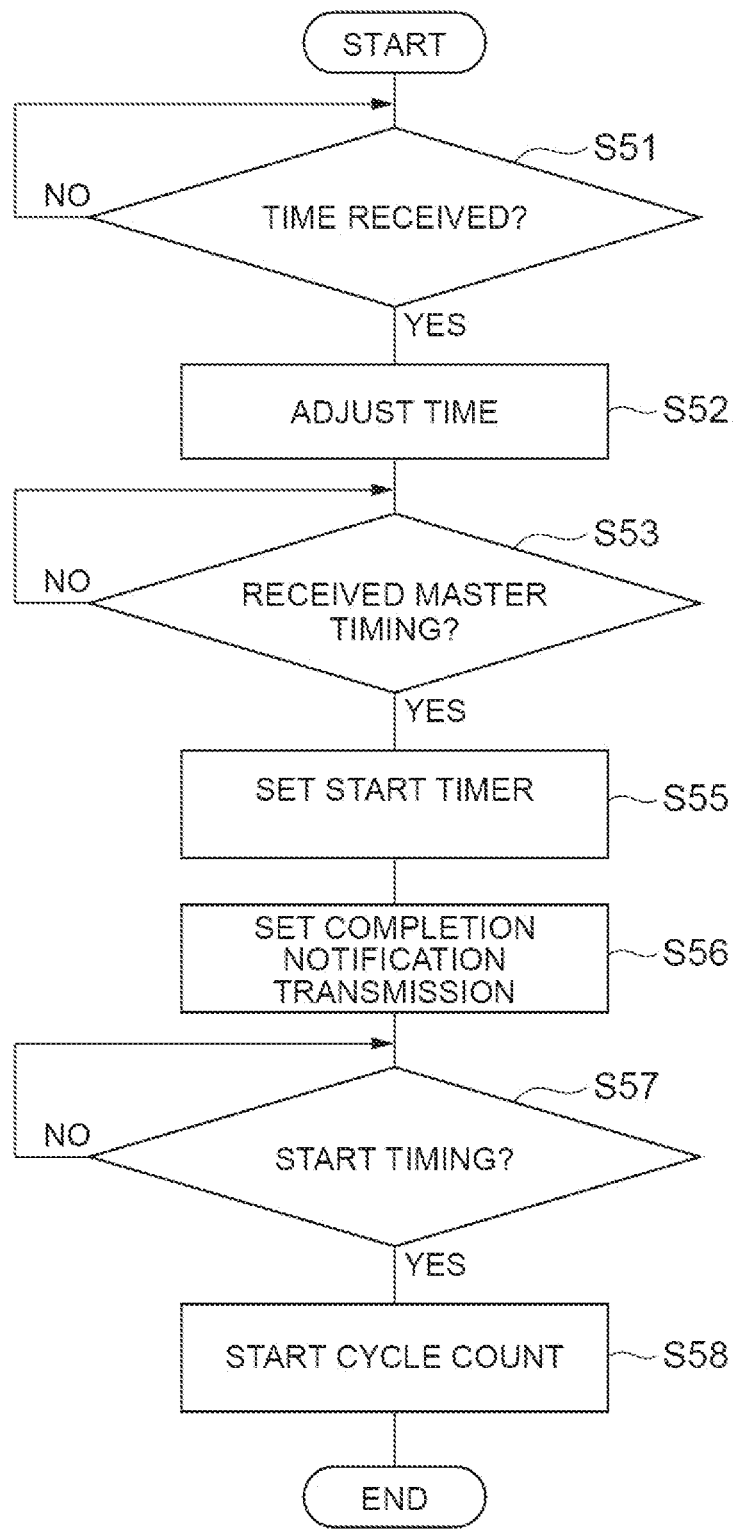
FIG. 12 is a flowchart showing a modification of the cycle generation procedure in the local controller.

As described above, the controller 100 may acquire the master timing via the wired communication network 8 and generate the control cycle based on the acquired master timing and the controller time. FIG. 12 is a flowchart showing a cycle generation procedure based on master timing. As shown in FIG. 12, the controller 100 first executes operations S51, S52, S53. In a operation S51, the controller time generation unit 121 waits for the synchronous communication unit 114 to receive the global time. In a operation S52, the controller time generation unit 121 generates the controller time in synchronization with the global time received by the synchronous communication unit 114. In a operation S53, the controller cycle generation unit 122 waits for the synchronous communication unit 114 to receive the master timing.

Next, the controller 100 executes operations S55, S56, S57, S58. In a operation S55, the controller cycle generation unit 122 sets start timing synchronized with the master timing. In a operation S56, the controller cycle generation unit 122 transmits a set completion notification to the communication controller 200. In a operation S57, the controller cycle generation unit 122 waits for the controller time to reach the start timing. In a operation S58, the controller cycle generation unit 122 starts generating the control cycle, and the timing transmission unit 123 starts counting the control cycle number. This completes the control cycle generation procedure in the controller 100.

(Overview of Machine Control Procedure)

The machine control procedure includes the controller 100 executing a motion program in the control cycle to generate a machine command for the subject machine 4, adding the first cycle information to the machine command, transmitting the machine command to the communication controller 200, the communication controller 200 receiving the machine command, transmitting the machine command to the subject local controller 300, the subject local controller 300 receiving the machine command from the communication controller 200, storing the received machine command and calling the machine body 10 to execute motion based on the called machine command.

The machine control procedure may further include the local controller 300 acquiring response information based on the motion executed by the machine body 10, adding second cycle information to the response information, transmitting the response information to the communication controller 200, the communication controller 200 or the controller 100 storing the received response information and calling the response information in the control cycle corresponding to the second cycle information added to the response information, and the controller 100 executing the motion program based on the called response information.

Figure 13:
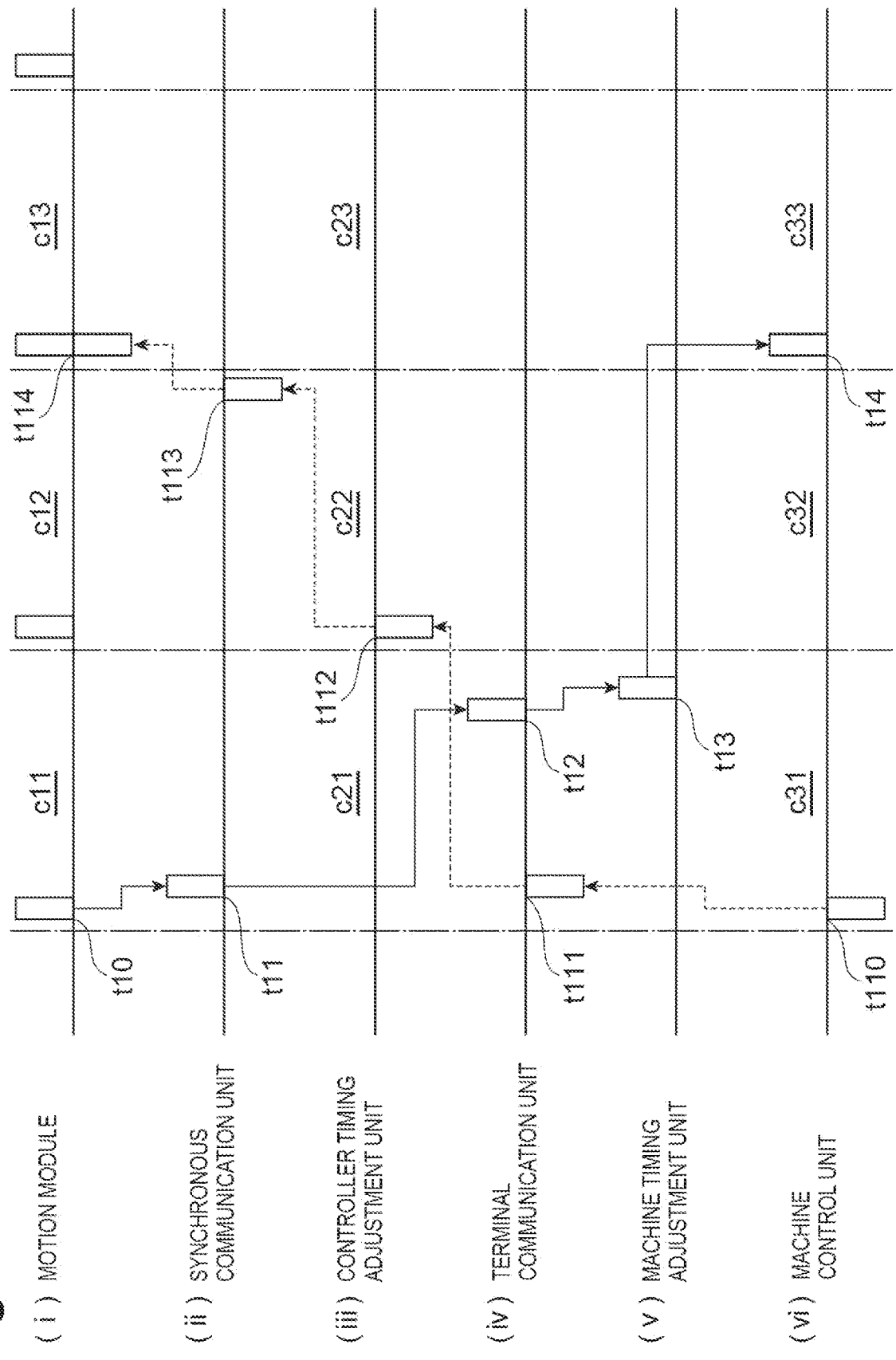
FIG. 13 is a timing chart illustrating a machine control procedure.

FIG. 13 is a timing chart illustrating an outline of the machine control procedure, and the horizontal axis of each chart represents elapsed time. (i) indicates an information process timing in the motion module 113, (ii) indicates an information process timing in the synchronous communication unit 114, (iii) indicates an information process timing in the controller timing adjustment unit 116, (iv) indicates an information process timing in the terminal communication unit 314, (v) indicates an information process timing in the machine timing adjustment unit 315, and (vi) indicates an information process timing in the machine control unit 313.

In FIG. 13, cycles c11, c12, c13 are control cycles sequentially generated by the controller cycle generation unit 122, cycles c21, c22, c23 are communication cycles sequentially generated by the communication cycle generation unit 131 in synchronization with the cycles c11, c12, c13, and cycles c31, c32, c33 are control cycles sequentially generated by the machine cycle generation unit 322 in synchronization with the cycles c11, c12, c13.

For example, the motion module 113 executes a motion program in time t10 of a cycle c11 and generates a machine command. This machine command is transmitted by the synchronous communication unit 114 in time t11 and received by the terminal communication unit 314 in time t12. The machine command received by the terminal communication unit 314 is stored in the machine timing adjustment unit 315 in time t13 and called in the control cycle (e.g., a cycle c33) corresponding to the first cycle information added to the machine command. Based on the called machine command, the machine control unit 313 causes the machine body 10 to execute motion in time t14 of the cycle c33. Although fluctuations occur in the time t12 due to wireless communication, fluctuations in the time t12 are absorbed by the margin from the time t12 to the time t14, and the machine command is used in the time t14 synchronized with the control cycle.

The machine control unit 313 acquires response information based on the motion executed by the machine body 10 in time t110 of a cycle c31. This response information is transmitted by the terminal communication unit 314 in time t111, stored by the controller timing adjustment unit 116 in time t112, and called in the control cycle (e.g., a cycle c13) corresponding to the second cycle information added to the response information. The called response information is stored in the received information storage unit 112 by the synchronous communication unit 114 in time t113 immediately before the cycle c13, and the motion module 113 executes the motion program in time t114 of the cycle c13 based on the response information stored in the received information storage unit 112. Although fluctuation occurs in the time t112 due to wireless communication, fluctuation in the time t112 is absorbed by the margin from the time t112 to the time t114, and response information is used in the time t114 synchronized with the control cycle.

Hereinafter, the machine control procedure will be divided into a control procedure in the controller 100 and a control procedure in the local controller 300, and examples will be described in detail.

(Control Procedure in Controller)

The control procedure in the controller 100 includes a data-receiving procedure and a data-generating/transmitting procedure. The data reception procedure and the data generation/transmission procedure are repeatedly executed in parallel. The data reception procedure may not be executed in synchronization with the control cycle, but the data generation/transmission procedure is executed in synchronization with the control cycle.

Figure 14:
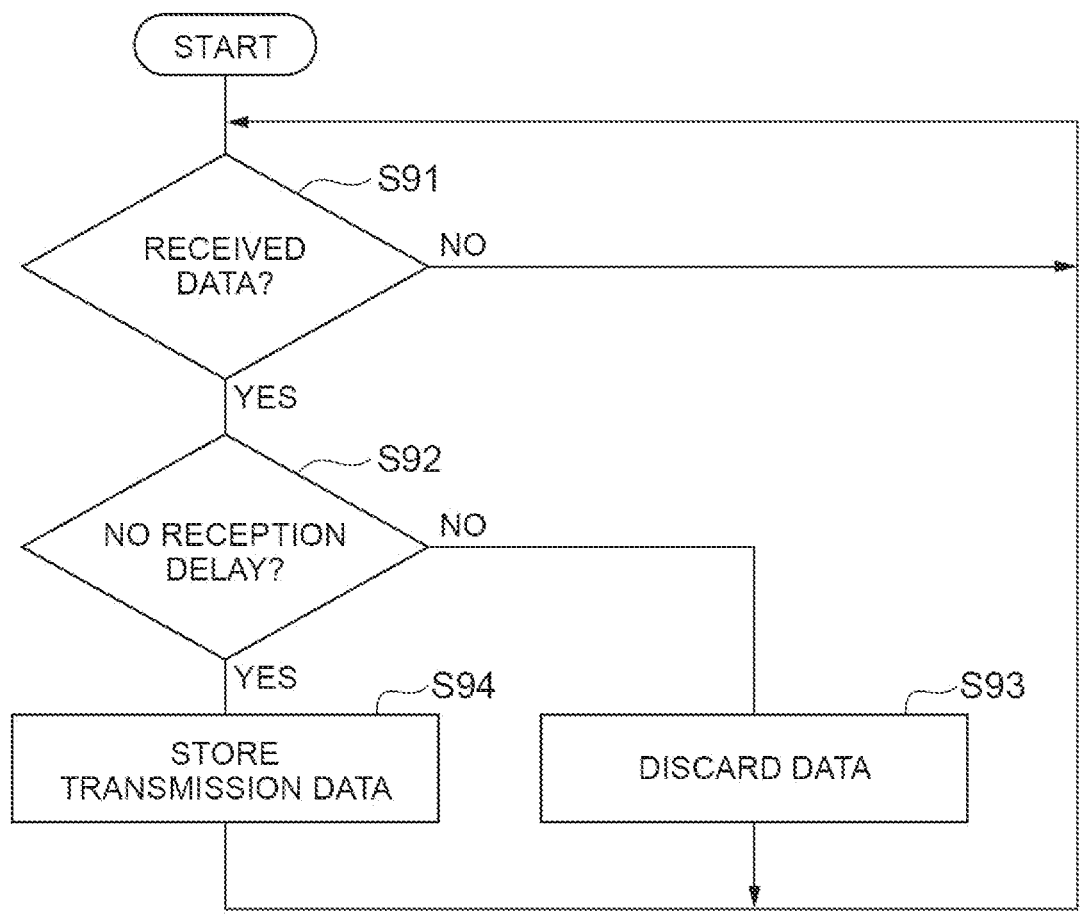
FIG. 14 is a flowchart illustrating a control procedure in the controller.

FIG. 14 is a flowchart illustrating a data reception procedure. As shown in FIG. 14, the controller 100 first executes operations S91, S92. In a operation S91, the synchronous communication unit 114 waits for data transmission from the communication controller 200. In a operation S92, the cycle check unit 133 checks whether there is a data reception delay. For example, the cycle check unit 133 checks whether there is a transmission delay of the response information based on the second cycle information added to the response information.

When the operation S92 determines that there is a data reception delay, the controller 100 executes a operation S93. In the operation S93, the cycle check unit 133 discards the received data.

When, in the operation S92, it is determined that there is no data reception delay, the controller 100 executes a operation S94. In the operation S94, the cycle check unit 133 stores the received data in the controller timing adjustment unit 116. After executing operations S93, S94, the controller 100 returns processing to the operation S91. The communication controller 200 repeats the above procedure.

Figure 15:
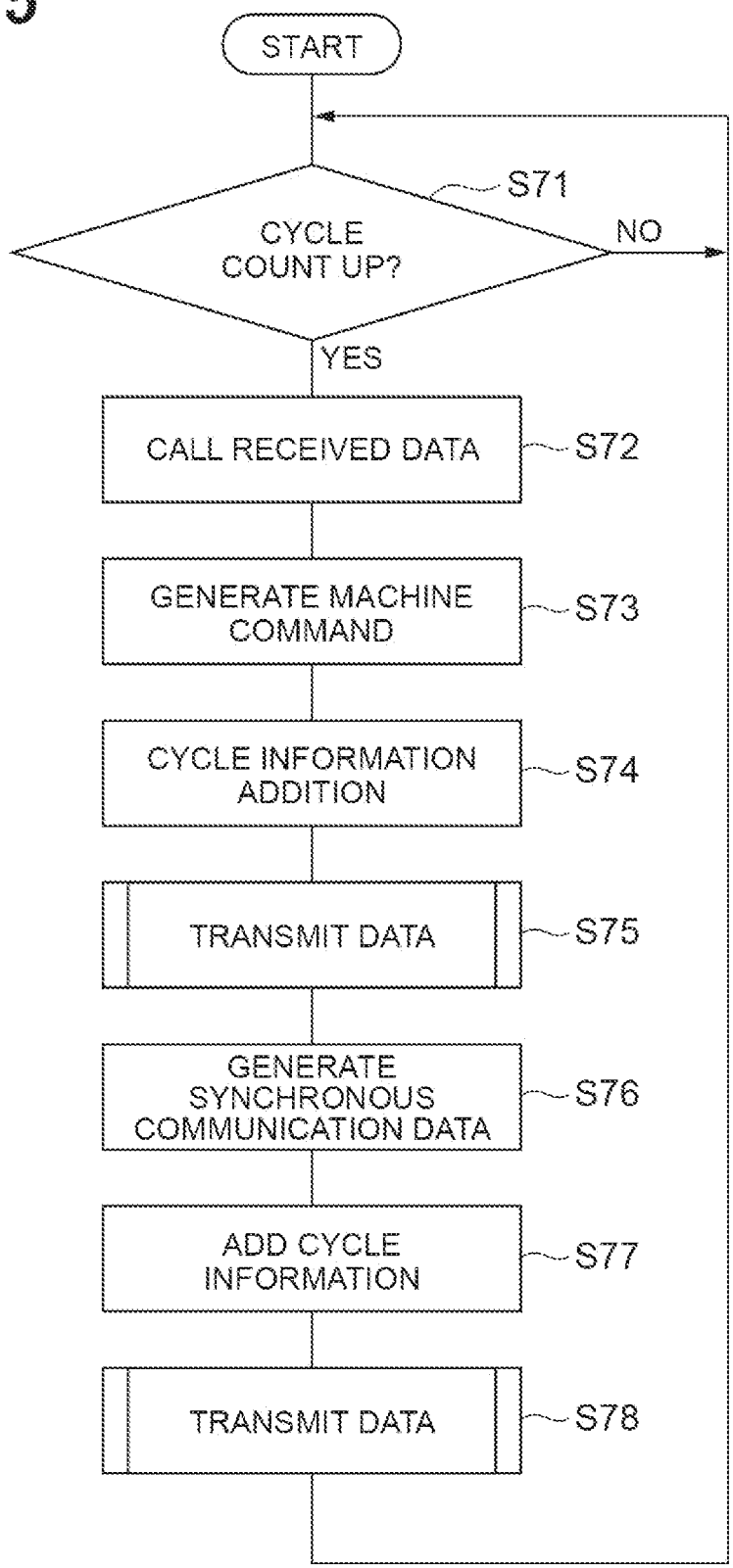
FIG. 15 is a flowchart illustrating a control procedure in the controller.

FIG. 15 is a flowchart illustrating a data generation/transmission procedure. The controller 100 first executes operations S71, S72, S73, S74, S75. In a operation S71, the motion module 113 waits for the cycle counter 124 to count up the control cycle number. In a operation S72, the controller timing adjustment unit 116 calls received information (e.g., response information and synchronous communication information) whose use cycle number corresponds to the current control cycle number. In a operation S73, the motion module 113 executes the motion program and generates the machine command for the subject machine 4. For example, the motion module 113 calculates the actual motion of the subject machine 4 based on the response information stored by the received information storage unit 112, and calculates the machine command so that the actual motion follows the motion command. In a operation S74, the addition unit 125 adds first cycle information to the machine command. In a operation S75, the synchronous communication unit 114 transmits the machine command to the communication server 3 via the wired communication network 8. Specific processing contents of the operation S75 will be described later.

Next, the controller 100 executes operations S76, S77, S78. In a operation S76, the synchronous communication unit 114 generates synchronous communication data. In a operation S77, the addition unit 125 adds first cycle information to synchronous communication data. In a operation S78, the synchronous communication unit 114 transmits synchronous communication data to the communication server 3 via the wired communication network 8. Specific processing contents of the operation S78 will be described later. The controller 100 then returns the process to the operation S71. The controller 100 repeats the above procedure.

Figure 16:
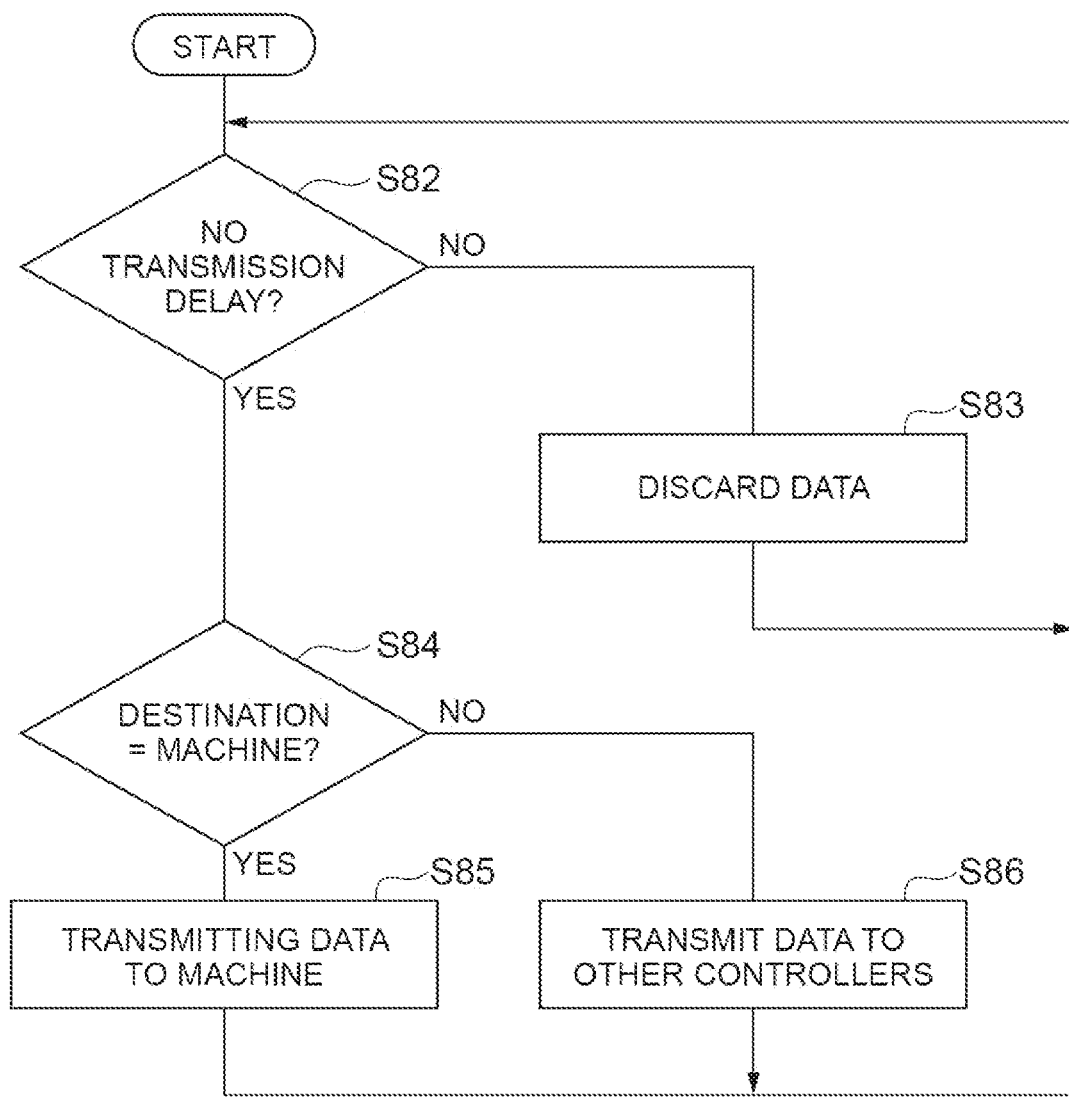
FIG. 16 is a flowchart illustrating a control procedure in the controller.

FIG. 16 is a flowchart illustrating a data transmission procedure in operations S76, S78. As shown in FIG. 16, the controller 100 first executes a operation S82. In the operation S82, the cycle check unit 133 checks whether there is a data transmission delay. For example, the cycle check unit 133 checks whether there is a transmission delay of the machine command based on the first cycle information added to the machine command, and checks whether there is a transmission delay of the synchronous communication data based on the first cycle information added to the synchronous communication data.

When, in the operation S82, it is determined that there is a data transmission delay, the controller 100 executes a operation S83. In the operation S83, the cycle check unit 133 discards the data for transmission.

When, in the operation S82, it is determined that there is no data transmission delay, the controller 100 executes a operation S84. In the operation S84, the switch 134 checks whether the data is addressed to the subject machine 4 or to the other controller 100.

If, the operation S84, it is determined that the data is addressed to the subject machine 4, the communication controller 200 executes a operation S85. In the operation S85, the switch 134 transmits the data to the subject machine 4 via the communication server 3.

If, the operation S84, it is determined that it is addressed to another the controller 100, the communication controller 200 executes a operation S86. In the operation S86, the switch 134 transmits the data to the controller timing adjustment unit 116 of another the controller 100 via the wired communication network 8. After executing operations S83, S85, S86, the controller 100 returns processing to the operation S82. The controller 100 repeats the above procedure.

(Control Procedure in Local Controller)

The control procedure in the local controller 300 includes a machine command reception procedure, a timing adjustment procedure, and a machine control procedure. These are repeatedly executed in parallel. The control procedure of the machine command may not be executed in synchronization with the control cycle, but the timing adjustment procedure is executed in synchronization with the control cycle. The machine control procedure is executed in synchronization with the machine cycle.

Figure 17:
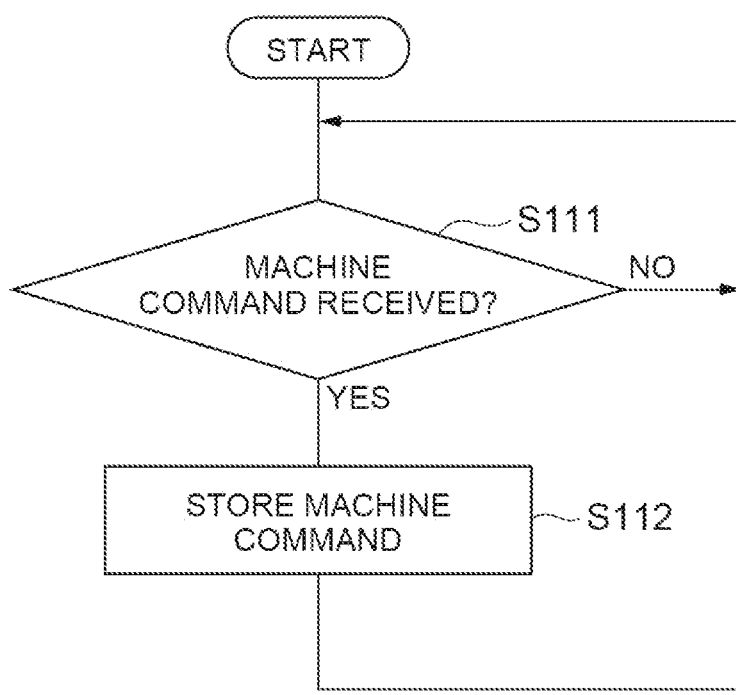
FIG. 17 is a flowchart illustrating a control procedure in the local controller.

FIG. 17 is a flowchart illustrating a procedure of receiving a machine command. As shown in FIG. 17, the local controller 300 executes operations S111, S112. In a operation S111, the terminal communication unit 314 waits for reception of the machine command. In a operation S112, the machine timing adjustment unit 315 stores the machine command. The local controller 300 then returns the process to the operation S111. The local controller 300 repeats the above procedure.

Figure 18:
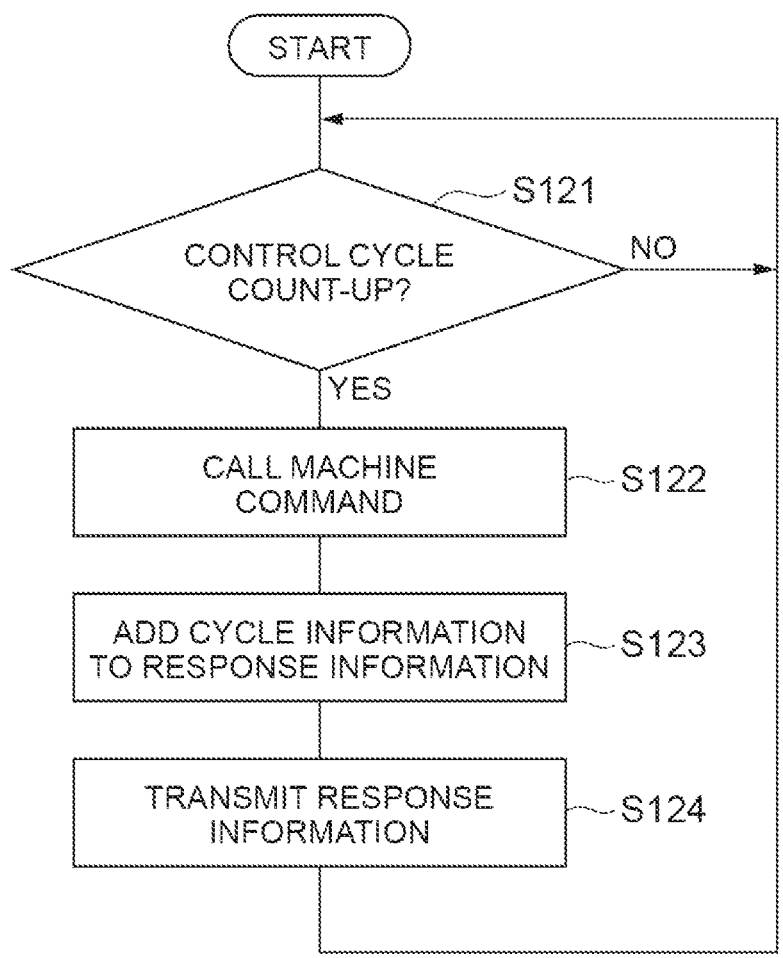
FIG. 18 is a flowchart illustrating a control procedure in the local controller.

FIG. 18 is a flowchart illustrating a timing adjustment procedure. As shown in FIG. 18, the local controller 300 executes operations S121, S122, S123, S124. In a operation S121, the machine timing adjustment unit 315 waits for the cycle counter 323 to count up the control cycle number. In a operation S122, the machine timing adjustment unit 315 calls the machine command whose use cycle number corresponds to the current control cycle number, and stores it in the command storage unit 311. As a result, the machine command stored in the command storage unit 311 is updated. In a operation S123, the addition unit 324 adds the second cycle information to the response information stored by the response information storage unit 312. In a operation S124, the terminal communication unit 314 transmits the response information to the communication controller 200 via the wireless communication network 7. The local controller 300 then returns the process to the operation S121. The local controller 300 repeats the above procedure.

Figure 19:
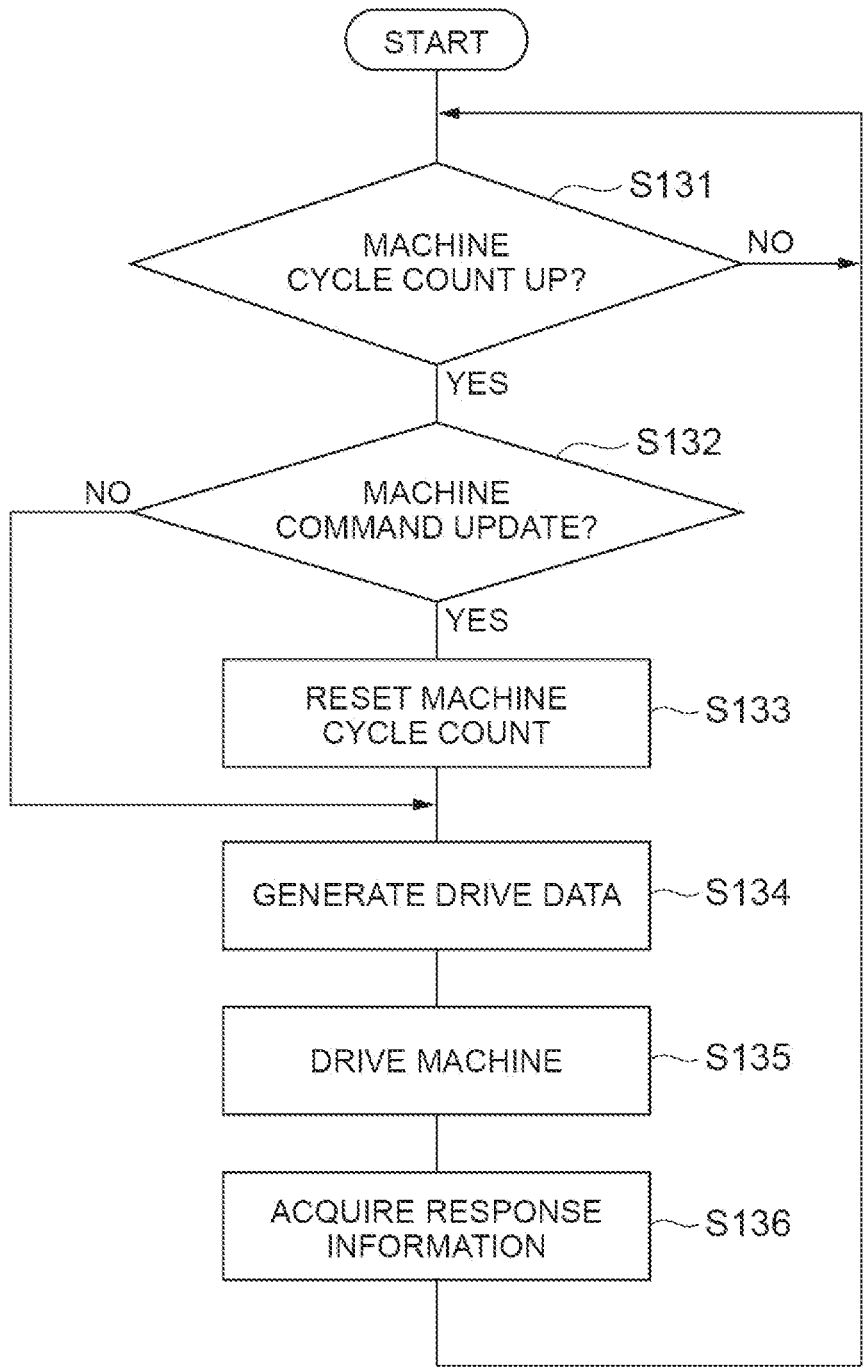
FIG. 19 is a flowchart illustrating a control procedure in the local controller.

FIG. 19 is a flowchart illustrating a machine control procedure. As shown in FIG. 19, the local controller 300 first executes operations S131, S132. In a operation S131, the machine control unit 313 waits for the cycle counter 326 to count up the machine cycle number. In a operation S132, the cycle counter 326 checks whether the machine command stored in the command storage unit 311 has been updated.

If the operation S132 determines that the machine command stored by the command storage unit 311 has been updated, the local controller 300 executes a operation S133. In the operation S133, the cycle counter 326 resets the machine cycle number to an initial value (for example, 0).

Next, the local controller 300 executes a operation S134. If the operation S132 determines that the machine command stored by the command storage unit 311 has not been updated, the local controller 300 executes the operation S134 without executing the operation S133. In the operation S134, the machine control unit 313 generates drive data so as to reduce deviation between the machine command and the response information stored in the response information storage unit 312.

Next, the local controller 300 executes operations S135, S136. In a operation S135, the machine control unit 313 drives the machine body 10 based on the drive data. In a operation S136, the machine control unit 313 acquires response information based on the motion executed by the machine body 10, and stores it in the response information storage unit 312. The local controller 300 then returns the process to the operation S131. The local controller 300 repeats the above procedure.

As described above, the machine control system 1 includes: one or more machines 4 configured on a real space, each of the one or more machines 4 configured to execute motion according to a machine command; one or more controllers 100 implemented on a virtual space to control the one or more machines 4, respectively; communication server 3 configured to communicate with the one or more controllers 100 via a wired communication network 8, and to communicate with the one or more machines 4 via a wireless communication network 7, wherein each of the one or more controllers 100 includes: a motion module 113 configured to execute a motion program in a control cycle and to generate a machine command for a corresponding machine 4; an addition unit 125 configured to add first cycle information to the machine command; and a synchronous communication unit 114 configured to transmit the machine command to the communication server 3, and wherein each of the one or more machines 4 includes: a terminal communication unit 314 configured to receive the machine command from the communication server 3; a machine timing adjustment unit 315 configured to store the machine command received by the terminal communication unit 314 and calls the machine command in the control cycle corresponding to the first cycle information added to the machine command.

With the practical use of the fifth generation mobile communication system (5G) and the like, high speed wireless communication has been available, and thus the feasibility of machine control via wireless communication has also increased. In machine control, it generation of a machine command by execution of a motion program and control of a machine according to the machine command may be repeated at a predetermined control cycle. When the generated machine command is transmitted via a wireless communication network, the fluctuation of the reception timing of the machine command on the machine side may increase due to the wireless communication, and it may be difficult for the machine side to receive the machine command in the control cycle. According to the machine control system 1, the machine command transmitted from the communication server 3 via the wireless communication network 7 is buffered on the machine 4 side and called in the control cycle corresponding to the first cycle information. As described above, by the function of buffering the machine command until its use timing, the transmission of the machine command from the controller 100 side may be advanced and a margin in the period from the reception timing of the machine command in the machine 4 to the use timing of the machine command may be provided. With this margin, the fluctuation of the reception timing expanded due to the wireless communication may be absorbed and the buffered machine command may be called in the control cycle. Therefore, in a system in which the machine command is transmitted via wireless communication, generation of the machine command by execution of the motion program and control of the machine according to the machine command can be repeated in a control cycle. Therefore, it is effective for realization of machine control via wireless communication.

Each of the one or more machines 4 may further includes: a machine body 10 configured to execute motion; a machine control unit 313 configured to cause the machine body 10 to execute motion based on the machine command called by the machine timing adjustment unit 315, and to acquire response information based on the motion executed by the machine body 10; an addition unit 324 configured to add second cycle information to the response information; a terminal communication unit 314 configured to transmit the response information to the communication server 3, the machine control system 1 may further includes a controller timing adjustment unit 116, 213 configured to store the response information received from the one or more machines 4 between the one or more controllers 100 and the communication server 3, and to call the response information in the control cycle corresponding to the second cycle information added to the response information, and the motion module 113 may execute the motion program according to the response information called by the controller timing adjustment unit 116, 213. In this case, the response information transmitted from the machine 4 via the wireless communication network is buffered in the controller 100 and called in the control cycle corresponding to the first cycle information. As described above, by the function of buffering the response information up to the use timing thereof, the transmission of the response information from the machine 4 side may be advanced and a margin in the period from the reception timing of the response information to the use timing of the response information in the controller 100 side may be provided. With this margin, the fluctuation of the reception timing expanded due to the wireless communication may be absorbed and the buffered response information may be called in the control cycle. Therefore, in a system in which the response information is transmitted via wireless communication, reception of the response information can be repeated in the control cycle. Therefore, it is more effective for realization of machine control via wireless communication.

Each of the one or more controllers 4 may further includes a timing transmission unit 123 configured to transmit a cycle timing of the control cycle to the corresponding machine 4, and each of the one or more machines 4 further includes a machine cycle generation unit 322 configured to generate the control cycle in the machine synchronized with the control cycle in the corresponding controller 100 based on the cycle timing. In this case, after the synchronization processing based on the cycle timing, the control cycle synchronized with the control cycle in the controller 100 is generated in the machine 4. Therefore, the control cycle in the machine 4 may be easily synchronized with the control cycle in the controller while suppressing the load of wireless communication.

Each of the one or more controllers 100 may further includes: a controller time generation unit 121 configured to generate a controller time in synchronization with a time generated by a time server 5; and a controller cycle generation unit 122 configured to generate the control cycle based on the controller time, each of the one or more machines 4 may further includes a machine time generation unit configured to generate machine time in synchronization with the time generated by the time server 5, and the machine cycle generation unit 322 may be configured to generate the control cycle based on the time generated by the machine time generation unit 121 and the cycle timing. In this case, by performing time matching in the controller 100 and the machine 4 in advance, even if the reception timing of the cycle timing in the machine 4 fluctuates, the control cycle in the machine 4 can be generated based on the machine time.

The timing transmission unit 123 may further be configured to, when the machine cycle generation unit 322 of the corresponding machine 4 fails to generate the control cycle, retransmit to the machine 4 a cycle timing after the previously transmitted cycle timing. In this case, the control cycle in the machine 4 can be synchronized with the control cycle in the controller 100 with higher reliability.

The machine control unit 313 may further be configured to control the machine body 10 in a machine cycle having a cycle length shorter than the control cycle based on a machine command called by the machine timing adjustment unit 315. In this case, both the constant periodicity of the call of the machine command by the control cycle and the control of the machine by the more subdivided machine cycle may be achieved.

The machine control system 1 may include a plurality of controllers 100 as the one or more controllers 100, and each of the plurality of controllers 100 may have the controller timing adjustment unit 116. In this case, while synchronous communication can be performed between each of the plurality of controllers 100 and the subject machine 4, synchronize control cycles between a plurality of pairs of the controller 100 and the machine 4 that use the same network is reduced, and the system can be easily configured.

The machine control system 1 may further includes a switch 134 configured to: transmit data transmitted by the synchronous communication unit 114 of one controller 100 in the plurality of controllers 100 to the machine 4 via the communication server 3 if the data is addressed to the machine 4; and transmit the data to the controller timing adjustment unit 116 of the other controller 100 via the wired communication network 8 if the data is addressed to the other controller 100. In this case, the synchronous communication unit 114 can be used for the synchronous communication between the controller 100 and the machine 4 and the synchronous communication between the controllers 100.

The one controller 100 further includes an asynchronous communication unit 115 configured to transmit asynchronous communication data for another node including the other controller 100, to the other node via the wired communication network 8. In this case, a communication source for synchronous communication can be saved.

At least one of the plurality of controllers 100 may further include a controller cycle generation unit 122 configured to generate the control cycle based on a master timing received via the wired communication network 8. In this case, control cycles can be easily synchronized between the controller 100.

The communication server 3 may include a timing master 224 configured to generate the master timing, the controller cycle generation unit 122 may be further configured to receive the master timing from the timing master 224. In this case, the same setting for generating the control cycle based on the master timing generated by the timing master 224 of the communication server 3 can be employed in any of the plurality of controllers 100 in which the control cycle is to be synchronized. Therefore, the controller 100 may be easily added/deleted to/from the system.

The machine control system 1 may further include a cycle check unit 133, 225 configured to detect a transmission delay of the machine command between the one or more controllers 100 and the communication server 3 based on the first cycle information included in the machine command. In this case, the reliability of the transmission of the machine command synchronized with the control cycle can be improved.

The cycle check unit 133 may be further configured to cancel transmission of the machine command when detecting the transmission delay of the machine command. In this case, the wireless communication source in the communication server 3 can be saved by canceling the transmission of the machine command that is not in time for the call in the control cycle.

The machine control system 1 may further include a cycle check unit 133 configured to detect a reception delay of the response information based on the second cycle information included in the response information between the one or more controllers 100 and the communication server 3. In this case, the response information that is not in time for a call in the control cycle may be detected in advance, and to take measures such as preventing a loss of response information by substituting, for example, response information called immediately before.

The machine control system 1 may further include a communication cycle generation unit 131, 222 configured to generate a communication cycle between the one or more controllers 100 and the communication server 3 in synchronization with at least one control cycle of the one or more controllers 100, and the cycle check unit 133, 225 may further be configured to detect the transmission delay of the machine command based on the first cycle information added to the machine command and cycle information of the communication cycle. In this case, the cycle check unit 133, 225 can easily detect the transmission delay.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A machine control system comprising:
   a machine comprising a machine body and machine circuitry configured to control the machine body to execute a motion according to a machine command;
   a controller server comprising control circuitry configured to control the machine; and
   a communication server comprising communication circuitry configured to communicate with the controller server via a wired communication network, and to communicate with the machine via a wireless communication network,
   wherein the control circuitry is configured to repeat operations according to a control cycle, the operations including:
      executing a motion program to generate the machine command for the machine;
      adding first cycle information designating a first use timing to the machine command; and
      transmitting the machine command including the first cycle information to the communication server,
   wherein the machine circuitry is configured to:

repeat local operations for controlling the machine according to a local control cycle;
store the machine command received from the communication server; and
call the stored machine command, based on the first cycle information added to the stored machine command, to use the machine command in the local control cycle corresponding to the first use timing,
wherein the local operations comprise:
causing the machine body to execute the motion based on the called machine command;
acquiring response information based on the motion executed by the machine body;
adding second cycle information designating a second use timing to the response information; and
transmitting the response information including the second cycle information to the communication server, and
wherein the control circuitry or the communication circuitry is further configured to:
store the response information received from the machine; and
call the stored response information, based on the second cycle information added to the stored response information, to execute the motion program according to the called response information in the control cycle corresponding to the second use timing.

2. The machine control system according to claim 1, wherein the control circuitry is configured to:
store the response information received from the machine; and
call the stored response information, based on the second cycle information added to the stored response information, to execute the motion program according to the called response information in the control cycle corresponding to the second use timing.

3. The machine control system according to claim 1, wherein the local control cycle has a local cycle length equal to a cycle length of the control cycle.

4. A machine control system comprising:
a machine configured to execute a motion according to a machine command;
a controller server configured to control the machine; and
a communication server configured to communicate with the controller server via a wired communication network, and to communicate with the machine via a wireless communication network,
wherein the controller server comprises control circuitry configured to repeat operations according to a control cycle, the operations including:
executing a motion program to generate the machine command for the machine;
adding first cycle information designating a first use timing to the machine command; and
transmitting the machine command including the first cycle information to the communication server,
wherein the machine comprises machine circuitry configured to:
repeat local operations for controlling the machine according to a local control cycle;
store the machine command received from the communication server; and
call the stored machine command, based on the first cycle information added to the stored machine command, to use the machine command in the local control cycle corresponding to the first use timing,
wherein the control circuitry is further configured to transmit cycle timing information identifying a cycle timing of the control cycle to the machine, and
wherein the machine circuitry is further configured to generate the local control cycle synchronized with the control cycle based on the cycle timing information.

5. The machine control system according to claim 4, wherein the control circuitry is further configured to:
generate a controller time in synchronization with a global time generated by a time server; and
generate the control cycle based on the controller time, and
wherein the machine circuitry is further configured to:
generate a machine time in synchronization with the global time; and
generate the local control cycle based on the machine time and the cycle timing information.

6. The machine control system according to claim 5, wherein the control circuitry is further configured to, when the machine circuitry fails to generate the local control cycle, retransmit to the machine the cycle timing information identifying the cycle timing later than the previously identified cycle timing.

7. The machine control system according to claim 1, wherein the machine circuitry is further configured to repeat controlling the machine body according to a machine cycle having a machine cycle length shorter than a local cycle length of the local control cycle, based on the called machine command.

8. The machine control system according to claim 1, wherein the control circuitry comprises a plurality of controllers configured to control a plurality of machines, and
wherein each of the plurality of controllers is configured to:
store the response information received from a corresponding machine of the plurality of machines; and
call the stored response information, based on the second cycle information added to the stored response information, to execute the motion program according to the called response information in the control cycle corresponding to the second use timing.

9. The machine control system according to claim 8, wherein one controller of the plurality of controllers is further configured to:
add the first cycle information to synchronous communication data; and
transmit the synchronous communication data including the first cycle information to another controller of the plurality of controllers, and
wherein the other controller is further configured to:
store the synchronous communication data received from the one controller;
call the stored synchronous communication data, based on the first cycle information added to the stored synchronous communication data, to execute the motion program according to the called synchronous communication data in the control cycle corresponding to the first use timing.

10. The machine control system according to claim 9, wherein the one controller is further configured to transmit asynchronous communication data without adding the first cycle information via the wired communication network.

11. The machine control system according to claim 8, wherein at least one of the plurality of controllers is further configured to generate the control cycle based on master timing information designating a master timing received via the wired communication network.

12. The machine control system according to claim 11, wherein the communication circuitry is further configured to:
   generate the master timing; and
   transmit the master timing information designating the generated master timing to the at least one of the plurality of controllers.

13. The machine control system according to claim 1, wherein the control circuitry or the communication circuitry is further configured to detect a reception delay of the response information based on the second cycle information added to the response information.

14. The machine control system according to claim 1, wherein the communication circuitry is further configured to detect a transmission delay of the machine command based on the first cycle information added to the machine command.

15. The machine control system according to claim 1, wherein the communication circuitry is configured to:
   store the response information received from the machine; and
   call the stored response information, based on the second cycle information added to the stored response information, to execute the motion program according to the called response information in the control cycle corresponding to the second use timing.

16. The machine control system according to claim 1, wherein the control circuitry is further configured to detect a transmission delay of the machine command based on the first cycle information added to the machine command.

17. The machine control system according to claim 16, wherein the control circuitry is further configured to cancel a transmission of the machine command when detecting the transmission delay of the machine command.

18. The machine control system according to claim 16, wherein the control circuitry is further configured to:
   generate a communication cycle in synchronization with the control cycle; and
   detect the transmission delay of the machine command based on the first cycle information added to the machine command and the communication cycle.

19. A machine comprising:
   a machine body configured to execute a motion;
   a terminal communication device configured to:
      communicate, via a wireless communication network, with a communication server configured to communicate with a control server via a wired communication network; and
      receive a machine command to which the control server has added cycle information designating a use timing via the communication server; and
   machine control circuitry configured to:
      repeat local operations for controlling the machine body according to a local control cycle,
      store the machine command received by the terminal communication device; and
      call the stored machine command, based on the cycle information added to the stored machine command, to cause the machine body to execute motion based on the called machine command in the local control cycle corresponding to the use timing,
   wherein the local operations comprise:
      causing the machine body to execute the motion based on the called machine command;
      acquiring response information based on the motion executed by the machine body; and
      adding second cycle information designating a second use timing to the response information,
   wherein the terminal communication device is further configured to transmit the response information including the second cycle information to the communication server, and
   wherein the response information received by the communication server is stored and called, based on the second cycle information added to the stored response information, to generate the motion command according to the called response information in a control cycle corresponding to the second use timing.

20. A communication method comprising:
   transmitting a machine command from a control server to a machine via a wireless communication network, wherein the controller server is configured to repeat operations, the operations including:
      executing a motion program to generate the machine command for the machine; and
      adding first cycle information designating a first use timing to the machine command;
   storing the machine command received via the wireless communication network;
   calling the stored machine command, based on the first cycle information added to the stored machine command, to use the machine command in a local control cycle corresponding to the first use timing, wherein the machine is configured to repeat local operations according to the local control cycle, the local operations including:
      causing the machine body to execute the motion based on the called machine command;
   acquiring response information based on the motion executed by the machine body; and
      adding second cycle information designating a second use timing to the response information;
   transmitting the response information including the second cycle information from the machine to the control server via the wireless communication network;
   storing the response information received via the wireless communication network; and
   calling the stored response information, based on the second cycle information added to the stored response information, to execute the motion program according to the called response information in the control cycle corresponding to the second use timing.

21. The machine control system according to claim 1, wherein the control circuitry is further configured to transmit cycle timing information identifying a cycle timing of the control cycle to the machine, and
   wherein the machine circuitry is further configured to generate the local control cycle synchronized with the control cycle based on the cycle timing information.

* * * * *